(12) United States Patent
Seth

(10) Patent No.: US 10,956,947 B2
(45) Date of Patent: Mar. 23, 2021

(54) METHODS AND APPARATUS TO MEASURE MEDIA USING MEDIA OBJECT CHARACTERISTICS

(71) Applicant: The Nielsen Company (US), LLC, Schaumburg, IL (US)

(72) Inventor: Amitabh Seth, Saratoga, CA (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 1104 days.

(21) Appl. No.: 14/329,779

(22) Filed: Jul. 11, 2014

(65) Prior Publication Data
US 2015/0180989 A1 Jun. 25, 2015

Related U.S. Application Data

(63) Continuation of application No. PCT/US2014/036298, filed on May 1, 2014.
(Continued)

(51) Int. Cl.
*H04L 29/08* (2006.01)
*G06Q 30/02* (2012.01)

(52) U.S. Cl.
CPC ..... *G06Q 30/0277* (2013.01); *G06Q 30/0276* (2013.01)

(58) Field of Classification Search
CPC .......... G06Q 30/0277; G06Q 30/0276; H04N 21/45; H04N 21/4667; H04L 61/22
See application file for complete search history.

(56) References Cited

U.S. PATENT DOCUMENTS

| 3,540,003 A | 11/1970 | Murphy |
| 3,818,458 A | 6/1974 | Deese |

(Continued)

FOREIGN PATENT DOCUMENTS

| AU | 2013205736 | 5/2013 |
| CN | 1898662 | 1/2007 |

(Continued)

OTHER PUBLICATIONS

IP Australia, "Examination Report No. 1," issued in connection with Australian Patent Application No. 2014370451, dated Jan. 6, 2017, 3 pages.

(Continued)

*Primary Examiner* — Oanh Duong
(74) *Attorney, Agent, or Firm* — Hanley, Flight & Zimmerman, LLC

(57) ABSTRACT

Methods and apparatus to collect impressions using media object characteristics are disclosed. A disclosed example method involves, based on first instructions associated with a collector media object presented at a client device, collecting a first characteristic of the collector media object and collecting second characteristics corresponding to a plurality of second media objects that are presented at the client device concurrently with the collector media object. The example method also involves, based on second instructions associated with the collector media object, reporting multiple impressions corresponding to the collector media object and to the second media objects by sending the first and second characteristics and an identifier associated with the client device in a single communication to an audience measurement entity.

31 Claims, 11 Drawing Sheets

Related U.S. Application Data

(60) Provisional application No. 61/920,048, filed on Dec. 23, 2013.

(56) References Cited

U.S. PATENT DOCUMENTS

| | | |
|---|---|---|
| 3,906,450 A | 9/1975 | Prado, Jr. |
| 3,906,454 A | 9/1975 | Martin |
| T955,010 I4 | 2/1977 | Ragonese et al. |
| 4,168,396 A | 9/1979 | Best |
| 4,230,990 A | 10/1980 | Lert, Jr. et al. |
| 4,232,193 A | 11/1980 | Gerald |
| 4,306,289 A | 12/1981 | Lumley |
| 4,319,079 A | 3/1982 | Best |
| 4,361,832 A | 11/1982 | Cole |
| 4,367,525 A | 1/1983 | Brown et al. |
| 4,558,413 A | 12/1985 | Schmidt et al. |
| 4,588,991 A | 5/1986 | Atalla |
| 4,590,550 A | 5/1986 | Eilert et al. |
| 4,595,950 A | 6/1986 | Löfberg |
| 4,621,325 A | 11/1986 | Naftzger et al. |
| 4,658,093 A | 4/1987 | Hellman |
| 4,672,572 A | 6/1987 | Alsberg |
| 4,685,056 A | 8/1987 | Barnsdale, Jr. et al. |
| 4,696,034 A | 9/1987 | Wiedemer |
| 4,703,324 A | 10/1987 | White |
| 4,712,097 A | 12/1987 | Hashimoto |
| 4,718,005 A | 1/1988 | Feigenbaum et al. |
| 4,720,782 A | 1/1988 | Kovalcin |
| 4,734,865 A | 3/1988 | Scullion et al. |
| 4,740,890 A | 4/1988 | William |
| 4,747,139 A | 5/1988 | Taaffe |
| 4,754,262 A | 6/1988 | Hackett et al. |
| 4,757,533 A | 7/1988 | Allen et al. |
| 4,791,565 A | 12/1988 | Dunham et al. |
| 4,821,178 A | 4/1989 | Levin et al. |
| 4,825,354 A | 4/1989 | Agrawal et al. |
| 4,827,508 A | 5/1989 | Shear |
| 4,866,769 A | 9/1989 | Karp |
| 4,914,689 A | 4/1990 | Quade et al. |
| 4,926,162 A | 5/1990 | Pickell |
| 4,940,976 A | 7/1990 | Gastouniotis et al. |
| 4,956,769 A | 9/1990 | Smith |
| 4,970,644 A | 11/1990 | Berneking et al. |
| 4,977,594 A | 12/1990 | Shear |
| 5,023,907 A | 6/1991 | Johnson et al. |
| 5,032,979 A | 7/1991 | Hecht et al. |
| 5,086,386 A | 2/1992 | Islam |
| 5,113,518 A | 5/1992 | Durst, Jr. et al. |
| 5,182,770 A | 1/1993 | Medveczky et al. |
| 5,204,897 A | 4/1993 | Wyman |
| 5,214,780 A | 5/1993 | Ingoglia et al. |
| 5,233,642 A | 8/1993 | Renton |
| 5,283,734 A | 2/1994 | Von Kohorn |
| 5,287,408 A | 2/1994 | Samson |
| 5,343,239 A | 8/1994 | Lappington et al. |
| 5,355,484 A | 10/1994 | Record et al. |
| 5,374,951 A | 12/1994 | Welsh |
| 5,377,269 A | 12/1994 | Heptig et al. |
| 5,388,211 A | 2/1995 | Hornbuckle |
| 5,406,269 A | 4/1995 | Baran |
| 5,410,598 A | 4/1995 | Shear |
| 5,440,738 A | 8/1995 | Bowman et al. |
| 5,444,642 A | 8/1995 | Montgomery et al. |
| 5,450,134 A | 9/1995 | Legate |
| 5,483,658 A | 1/1996 | Grube et al. |
| 5,497,479 A | 3/1996 | Hornbuckle |
| 5,499,340 A | 3/1996 | Barritz |
| 5,584,050 A | 12/1996 | Lyons |
| 5,594,934 A | 1/1997 | Lu et al. |
| 5,675,510 A | 10/1997 | Coffey et al. |
| 5,793,409 A | 8/1998 | Tetsumura |
| 5,796,952 A | 8/1998 | Davis et al. |
| 5,848,396 A | 12/1998 | Gerace |
| 5,948,061 A | 9/1999 | Merriman et al. |
| 6,035,339 A | 3/2000 | Agraharam et al. |
| 6,052,730 A | 4/2000 | Felciano et al. |
| 6,055,573 A | 4/2000 | Gardenswartz et al. |
| 6,098,093 A | 8/2000 | Bayeh et al. |
| 6,102,406 A | 8/2000 | Miles et al. |
| 6,108,637 A | 8/2000 | Blumenau |
| 6,138,155 A | 10/2000 | Davis et al. |
| 6,164,975 A | 12/2000 | Weingarden et al. |
| 6,223,215 B1 | 4/2001 | Hunt et al. |
| 6,247,050 B1 | 6/2001 | Tso et al. |
| 6,279,036 B1 | 8/2001 | Himmel et al. |
| 6,286,140 B1 | 9/2001 | Ivanyi |
| 6,415,323 B1 | 7/2002 | McCanne et al. |
| 6,434,614 B1 | 8/2002 | Blumenau |
| 6,457,010 B1 | 9/2002 | Eldering et al. |
| 6,460,079 B1 | 10/2002 | Blumenau |
| 6,477,707 B1 | 11/2002 | King et al. |
| 6,529,952 B1 | 3/2003 | Blumenau |
| 6,606,657 B1 | 8/2003 | Zilberstein et al. |
| 6,658,410 B1 | 12/2003 | Sakamaki et al. |
| 6,714,917 B1 | 3/2004 | Eldering et al. |
| 6,839,680 B1 | 1/2005 | Liu et al. |
| 6,877,007 B1 | 4/2005 | Hentzel et al. |
| 6,993,590 B1 | 1/2006 | Gauthier et al. |
| 7,039,699 B1 | 5/2006 | Narin et al. |
| 7,092,926 B2 | 8/2006 | Cerrato |
| 7,139,723 B2 | 11/2006 | Conkwright et al. |
| 7,146,329 B2 | 12/2006 | Conkwright et al. |
| 7,150,030 B1 | 12/2006 | Eldering et al. |
| 7,152,074 B2 | 12/2006 | Dettinger et al. |
| 7,159,023 B2 | 1/2007 | Tufts |
| 7,181,412 B1 | 2/2007 | Fulgoni et al. |
| 7,257,546 B2 | 8/2007 | Ebrahimi et al. |
| 7,260,837 B2 | 8/2007 | Abraham et al. |
| 7,272,617 B1 | 9/2007 | Bayer et al. |
| 7,302,447 B2 | 11/2007 | Dettinger et al. |
| 7,343,417 B2 | 3/2008 | Baum |
| 7,363,643 B2 | 4/2008 | Drake et al. |
| 7,386,473 B2 | 6/2008 | Blumenau |
| 7,406,516 B2 | 7/2008 | Davis et al. |
| 7,526,538 B2 | 4/2009 | Wilson |
| 7,546,370 B1 | 6/2009 | Acharya et al. |
| 7,590,568 B2 | 9/2009 | Blumenau |
| 7,600,014 B2 | 10/2009 | Russell et al. |
| 7,613,635 B2 | 11/2009 | Blumenau |
| 7,627,872 B2 | 12/2009 | Hebeler et al. |
| 7,634,786 B2 | 12/2009 | Knee et al. |
| 7,644,156 B2 | 1/2010 | Blumenau |
| 7,647,418 B2 | 1/2010 | Ash et al. |
| 7,650,407 B2 | 1/2010 | Blumenau |
| 7,653,724 B2 | 1/2010 | Blumenau |
| 7,716,326 B2 | 5/2010 | Blumenau |
| 7,720,963 B2 | 5/2010 | Blumenau |
| 7,720,964 B2 | 5/2010 | Blumenau |
| 7,756,974 B2 | 7/2010 | Blumenau |
| 7,788,216 B2 | 8/2010 | Li et al. |
| 7,882,054 B2 | 2/2011 | Levitan |
| 7,882,242 B2 | 2/2011 | Chen |
| 7,890,451 B2 | 2/2011 | Cancel et al. |
| 7,925,694 B2 | 4/2011 | Harris |
| 7,941,525 B1 | 5/2011 | Yavilevich |
| 7,949,565 B1 | 5/2011 | Eldering et al. |
| 7,949,639 B2 | 5/2011 | Hunt et al. |
| 7,958,234 B2 | 6/2011 | Thomas et al. |
| 7,962,603 B1 | 6/2011 | Morimoto |
| 8,006,259 B2 | 8/2011 | Drake et al. |
| 8,032,626 B1 | 10/2011 | Russell et al. |
| 8,046,255 B2 | 10/2011 | Bistriceanu et al. |
| 8,060,601 B1 | 11/2011 | Brown et al. |
| 8,087,041 B2 | 12/2011 | Fu et al. |
| 8,131,861 B2 | 3/2012 | Butler et al. |
| 8,151,194 B1 | 4/2012 | Chan et al. |
| 8,180,112 B2 | 5/2012 | Kurtz et al. |
| 8,229,780 B2 | 7/2012 | Davidow et al. |
| 8,234,408 B2 | 7/2012 | Jungck |
| 8,235,814 B2 | 8/2012 | Willis et al. |
| 8,266,687 B2 | 9/2012 | Baldry |
| 8,271,886 B2 | 9/2012 | Lee et al. |
| 8,280,683 B2 | 10/2012 | Finkler |
| 8,302,120 B2 | 10/2012 | Ramaswamy |

(56) References Cited

U.S. PATENT DOCUMENTS

| | | |
|---|---|---|
| 8,307,006 B2 | 11/2012 | Hannan et al. |
| 8,370,489 B2 | 2/2013 | Mazumdar et al. |
| 8,412,648 B2 | 4/2013 | Karypis et al. |
| 8,453,173 B1 | 5/2013 | Anderson et al. |
| 8,468,271 B1 | 6/2013 | Panwar et al. |
| 8,484,511 B2 | 7/2013 | Tidwell et al. |
| 8,495,198 B2 | 7/2013 | Sim et al. |
| 8,504,411 B1 | 8/2013 | Subasic et al. |
| 8,543,454 B2 | 9/2013 | Fleischman et al. |
| 8,549,552 B2 | 10/2013 | Ramaswamy et al. |
| 8,600,796 B1 | 12/2013 | Sterne et al. |
| 8,631,122 B2 | 1/2014 | Kadam et al. |
| 8,688,524 B1 | 4/2014 | Ramalingam et al. |
| 8,689,356 B2 | 4/2014 | Kasahara et al. |
| 8,713,168 B2 | 4/2014 | Heffernan et al. |
| 8,751,461 B2 | 6/2014 | Abraham et al. |
| 8,775,332 B1 | 7/2014 | Morris et al. |
| 8,831,362 B1 | 9/2014 | Steffens |
| 8,843,626 B2 | 9/2014 | Mazumdar et al. |
| 8,898,689 B2 | 11/2014 | Georgakis |
| 8,909,771 B2 | 12/2014 | Heath |
| 8,910,195 B1 | 12/2014 | Barney et al. |
| 8,930,701 B2 | 1/2015 | Burbank et al. |
| 8,954,536 B2 | 2/2015 | Kalus et al. |
| 8,973,023 B1 | 3/2015 | Rao et al. |
| 8,984,547 B2 | 3/2015 | Lambert et al. |
| 9,015,743 B2 | 4/2015 | Ramaswamy |
| 9,055,021 B2 | 6/2015 | Heffernan et al. |
| 9,055,122 B2 | 6/2015 | Grecco et al. |
| 9,117,217 B2 | 8/2015 | Wilson et al. |
| 9,215,288 B2 | 12/2015 | Seth et al. |
| 9,218,612 B2 | 12/2015 | Mazumdar et al. |
| 9,508,011 B2 * | 11/2016 | Sharon .............. G06K 9/00744 |
| 9,596,151 B2 | 3/2017 | Heffernan et al. |
| 2002/0023159 A1 | 2/2002 | Vange et al. |
| 2002/0046104 A1 | 4/2002 | Kaddeche et al. |
| 2002/0099609 A1 | 7/2002 | Nascenzi et al. |
| 2002/0178441 A1 | 11/2002 | Hashimoto |
| 2003/0037131 A1 | 2/2003 | Verma |
| 2003/0046385 A1 | 3/2003 | Vincent |
| 2003/0065770 A1 | 4/2003 | Davis et al. |
| 2003/0074252 A1 | 4/2003 | Chandler-Pepelnjak et al. |
| 2003/0105604 A1 | 6/2003 | Ash et al. |
| 2003/0177488 A1 | 9/2003 | Smith et al. |
| 2003/0220901 A1 | 11/2003 | Carr et al. |
| 2004/0088212 A1 | 5/2004 | Hill |
| 2004/0098229 A1 | 5/2004 | Error et al. |
| 2004/0107125 A1 | 6/2004 | Guheen et al. |
| 2004/0167763 A1 | 8/2004 | Liebman |
| 2004/0167928 A1 | 8/2004 | Anderson et al. |
| 2004/0186840 A1 | 9/2004 | Dettinger et al. |
| 2005/0033657 A1 | 2/2005 | Herrington et al. |
| 2005/0144069 A1 | 6/2005 | Wiseman et al. |
| 2005/0166233 A1 | 7/2005 | Beyda et al. |
| 2005/0223093 A1 | 10/2005 | Hanson et al. |
| 2005/0267799 A1 | 12/2005 | Chan et al. |
| 2006/0074953 A1 | 4/2006 | Dettinger et al. |
| 2006/0089754 A1 | 4/2006 | Mortenson |
| 2006/0178996 A1 | 8/2006 | Matsushima et al. |
| 2006/0271641 A1 | 11/2006 | Stavrakos et al. |
| 2006/0294259 A1 | 12/2006 | Matefi et al. |
| 2007/0106787 A1 | 5/2007 | Blumenau |
| 2007/0106792 A1 | 5/2007 | Blumenau |
| 2007/0112714 A1 | 5/2007 | Fairweather |
| 2007/0156532 A1 | 7/2007 | Nyhan et al. |
| 2007/0198327 A1* | 8/2007 | Yazdani .............. G06Q 30/02 705/28 |
| 2007/0271518 A1 | 11/2007 | Tischer et al. |
| 2007/0271580 A1 | 11/2007 | Tischer et al. |
| 2007/0294729 A1 | 12/2007 | Ramaswamy |
| 2008/0000495 A1 | 1/2008 | Hansen et al. |
| 2008/0004958 A1 | 1/2008 | Ralph et al. |
| 2008/0086523 A1 | 4/2008 | Afergan et al. |
| 2008/0091639 A1 | 4/2008 | Davis et al. |
| 2008/0126420 A1 | 5/2008 | Wright et al. |
| 2008/0196084 A1 | 8/2008 | Hawkes |
| 2008/0201427 A1 | 8/2008 | Chen |
| 2008/0201472 A1 | 8/2008 | Bistriceanu et al. |
| 2008/0222201 A1 | 9/2008 | Chen et al. |
| 2008/0235243 A1 | 9/2008 | Lee et al. |
| 2008/0276179 A1 | 11/2008 | Borenstein et al. |
| 2008/0300965 A1 | 12/2008 | Doe |
| 2009/0030780 A1 | 1/2009 | York et al. |
| 2009/0055241 A1 | 2/2009 | Chen et al. |
| 2009/0070443 A1 | 3/2009 | Vanderhook et al. |
| 2009/0070797 A1 | 3/2009 | Ramaswamy et al. |
| 2009/0076899 A1 | 3/2009 | Gbodimowo |
| 2009/0171762 A1 | 7/2009 | Alkove et al. |
| 2009/0292587 A1 | 11/2009 | Fitzgerald |
| 2009/0307084 A1 | 12/2009 | Monighetti et al. |
| 2009/0327026 A1 | 12/2009 | Bistriceanu et al. |
| 2010/0004977 A1 | 1/2010 | Marci et al. |
| 2010/0010866 A1 | 1/2010 | Bal et al. |
| 2010/0070621 A1 | 3/2010 | Urdan et al. |
| 2010/0076814 A1 | 3/2010 | Manning |
| 2010/0088152 A1 | 4/2010 | Bennett |
| 2010/0088373 A1 | 4/2010 | Pinkham |
| 2010/0121676 A1 | 5/2010 | Jackson |
| 2010/0153175 A1 | 6/2010 | Pearson et al. |
| 2010/0153544 A1 | 6/2010 | Krassner et al. |
| 2010/0161385 A1 | 6/2010 | Karypis et al. |
| 2010/0191723 A1 | 7/2010 | Perez et al. |
| 2010/0205057 A1 | 8/2010 | Hook et al. |
| 2010/0241745 A1 | 9/2010 | Offen et al. |
| 2010/0262498 A1 | 10/2010 | Nolet et al. |
| 2010/0268540 A1 | 10/2010 | Arshi et al. |
| 2010/0268573 A1 | 10/2010 | Jain et al. |
| 2010/0281178 A1 | 11/2010 | Sullivan |
| 2010/0299604 A1 | 11/2010 | Blumenau |
| 2010/0312854 A1 | 12/2010 | Hyman |
| 2010/0313009 A1 | 12/2010 | Combet et al. |
| 2011/0087519 A1 | 4/2011 | Fordyce, III et al. |
| 2011/0087919 A1 | 4/2011 | Deshmukh et al. |
| 2011/0093327 A1 | 4/2011 | Fordyce, III et al. |
| 2011/0106620 A1 | 5/2011 | Setiawan et al. |
| 2011/0131596 A1 | 6/2011 | Amsterdam et al. |
| 2011/0137733 A1 | 6/2011 | Baird et al. |
| 2011/0153391 A1 | 6/2011 | Tenbrock |
| 2011/0157475 A1 | 6/2011 | Wright et al. |
| 2011/0191184 A1 | 8/2011 | Blackhurst et al. |
| 2011/0191664 A1 | 8/2011 | Sheleheda et al. |
| 2011/0191831 A1 | 8/2011 | Chan et al. |
| 2011/0196735 A1 | 8/2011 | von Sydow et al. |
| 2011/0202500 A1 | 8/2011 | Warn et al. |
| 2011/0208860 A1 | 8/2011 | Sim et al. |
| 2011/0231240 A1 | 9/2011 | Schoen et al. |
| 2011/0246297 A1 | 10/2011 | Buchalter et al. |
| 2011/0246306 A1 | 10/2011 | Blackhurst et al. |
| 2011/0246641 A1 | 10/2011 | Pugh et al. |
| 2011/0282730 A1 | 11/2011 | Tarmas |
| 2011/0288907 A1 | 11/2011 | Harvey et al. |
| 2012/0005015 A1 | 1/2012 | Park et al. |
| 2012/0005213 A1 | 1/2012 | Hanna et al. |
| 2012/0030037 A1 | 2/2012 | Carriero |
| 2012/0042005 A1 | 2/2012 | Papakostas et al. |
| 2012/0072469 A1* | 3/2012 | Perez ................ G06Q 30/0204 707/810 |
| 2012/0109709 A1 | 5/2012 | Fordyce, III et al. |
| 2012/0110027 A1 | 5/2012 | Falcon |
| 2012/0143713 A1 | 6/2012 | Dittus et al. |
| 2012/0151079 A1 | 6/2012 | Besehanic et al. |
| 2012/0151322 A1 | 6/2012 | Lindsay et al. |
| 2012/0158490 A1 | 6/2012 | Neumeyer et al. |
| 2012/0158954 A1* | 6/2012 | Heffernan ............ H04L 43/04 709/224 |
| 2012/0166520 A1 | 6/2012 | Lindsay et al. |
| 2012/0173701 A1 | 7/2012 | Tenbrock |
| 2012/0192214 A1 | 7/2012 | Hunn et al. |
| 2012/0206331 A1 | 8/2012 | Gandhi |
| 2012/0209920 A1 | 8/2012 | Neystadt et al. |
| 2012/0215621 A1 | 8/2012 | Heffernan et al. |
| 2012/0239407 A1 | 9/2012 | Lynch et al. |
| 2012/0239809 A1 | 9/2012 | Mazumdar et al. |
| 2012/0254466 A1 | 10/2012 | Jungck |

(56) References Cited

U.S. PATENT DOCUMENTS

| | | |
|---|---|---|
| 2012/0265606 A1 | 10/2012 | Patnode |
| 2012/0303454 A1 | 11/2012 | Gupta |
| 2012/0310729 A1 | 12/2012 | Dalto et al. |
| 2012/0311017 A1 | 12/2012 | Sze et al. |
| 2013/0007794 A1 | 1/2013 | Besehanic et al. |
| 2013/0014144 A1 | 1/2013 | Bhatia et al. |
| 2013/0019262 A1 | 1/2013 | Bhatia et al. |
| 2013/0046615 A1 | 2/2013 | Liyanage |
| 2013/0060629 A1 | 3/2013 | Rangsikitpho et al. |
| 2013/0066713 A1 | 3/2013 | Umeda |
| 2013/0080263 A1 | 3/2013 | Goldman et al. |
| 2013/0097311 A1 | 4/2013 | Mazumdar et al. |
| 2013/0097312 A1 | 4/2013 | Mazumdar et al. |
| 2013/0117103 A1 | 5/2013 | Shimizu et al. |
| 2013/0124628 A1 | 5/2013 | Weerasinghe |
| 2013/0138506 A1 | 5/2013 | Zhu et al. |
| 2013/0138743 A1 | 5/2013 | Amento et al. |
| 2013/0145022 A1 | 6/2013 | Srivastava et al. |
| 2013/0159499 A1 | 6/2013 | Besehanic |
| 2013/0166520 A1* | 6/2013 | Vass ............... H04N 21/2387 707/694 |
| 2013/0198125 A1 | 8/2013 | Oliver et al. |
| 2013/0204694 A1 | 8/2013 | Banister et al. |
| 2013/0212188 A1 | 8/2013 | Duterque et al. |
| 2013/0246389 A1 | 9/2013 | Osann, Jr. |
| 2013/0246609 A1 | 9/2013 | Topchy et al. |
| 2013/0262181 A1 | 10/2013 | Topchy et al. |
| 2013/0282898 A1 | 10/2013 | Kalus et al. |
| 2013/0290070 A1 | 10/2013 | Abraham et al. |
| 2013/0297411 A1 | 11/2013 | Van Datta et al. |
| 2013/0325588 A1 | 12/2013 | Kalyanam et al. |
| 2013/0331971 A1 | 12/2013 | Bida et al. |
| 2013/0332604 A1 | 12/2013 | Seth et al. |
| 2014/0033317 A1 | 1/2014 | Barber |
| 2014/0075004 A1 | 3/2014 | Van Dusen et al. |
| 2014/0108130 A1 | 4/2014 | Vos et al. |
| 2014/0122703 A1 | 5/2014 | Pugh et al. |
| 2014/0156761 A1 | 6/2014 | Heffernan et al. |
| 2014/0173646 A1 | 6/2014 | Ramaswamy |
| 2014/0214846 A1* | 7/2014 | Robert ............. G06F 17/30032 707/740 |
| 2014/0279074 A1 | 9/2014 | Chen et al. |
| 2014/0298025 A1 | 10/2014 | Burbank et al. |
| 2014/0324544 A1 | 10/2014 | Donato et al. |
| 2014/0324545 A1 | 10/2014 | Splaine et al. |
| 2014/0337104 A1 | 11/2014 | Splaine et al. |
| 2015/0019322 A1 | 1/2015 | Alla et al. |
| 2015/0019327 A1 | 1/2015 | Mazumdar et al. |
| 2015/0046579 A1 | 2/2015 | Perez et al. |
| 2015/0186403 A1 | 7/2015 | Srivastava et al. |
| 2015/0189500 A1 | 7/2015 | Bosworth et al. |
| 2015/0193816 A1 | 7/2015 | Toupet et al. |
| 2015/0222951 A1 | 8/2015 | Ramaswamy |
| 2015/0262207 A1 | 9/2015 | Rao et al. |
| 2016/0063539 A1 | 3/2016 | Alla et al. |

FOREIGN PATENT DOCUMENTS

| | | |
|---|---|---|
| CN | 101077014 | 11/2007 |
| EP | 0325219 | 7/1989 |
| EP | 0703683 | 3/1996 |
| EP | 0744695 | 11/1996 |
| EP | 1379044 | 1/2004 |
| EP | 2991018 | 3/2016 |
| GB | 2176639 | 12/1986 |
| JP | H05324352 | 12/1993 |
| JP | 7262167 | 10/1995 |
| JP | 2001084272 | 3/2001 |
| JP | 2001282982 | 10/2001 |
| JP | 2001357192 | 12/2001 |
| JP | 2002091852 | 3/2002 |
| JP | 2002163562 | 6/2002 |
| JP | 2002373152 | 12/2002 |
| JP | 2003044396 | 2/2003 |
| JP | 2003067289 | 3/2003 |
| JP | 2004504674 | 2/2004 |
| JP | 2006127320 | 5/2006 |
| JP | 2006127321 | 5/2006 |
| JP | 2007052633 | 3/2007 |
| JP | 2008083906 | 4/2008 |
| JP | 2008234641 | 10/2008 |
| JP | 2009181459 | 8/2009 |
| JP | 2010501939 | 1/2010 |
| JP | 2010039845 | 2/2010 |
| JP | 2010257448 | 11/2010 |
| JP | 2012068828 | 4/2012 |
| JP | 2012093970 | 5/2012 |
| JP | 2012520502 | 9/2012 |
| KR | 20020037980 | 5/2002 |
| KR | 20070051879 | 5/2007 |
| KR | 100765735 | 10/2007 |
| KR | 20110023293 | 3/2011 |
| KR | 20120091411 | 8/2012 |
| KR | 20120123148 | 11/2012 |
| WO | 9600950 | 1/1996 |
| WO | 9617467 | 6/1996 |
| WO | 9628904 | 9/1996 |
| WO | 9632815 | 10/1996 |
| WO | 9637983 | 11/1996 |
| WO | 9641495 | 12/1996 |
| WO | 9809447 | 3/1998 |
| WO | 2000041115 | 7/2000 |
| WO | 0154034 | 7/2001 |
| WO | 200152168 | 7/2001 |
| WO | 0207054 | 1/2002 |
| WO | 2003027860 | 4/2003 |
| WO | 2005013072 | 2/2005 |
| WO | 2005024689 | 3/2005 |
| WO | 2010083450 | 7/2010 |
| WO | 2010088372 | 8/2010 |
| WO | 2010104285 | 9/2010 |
| WO | 2011097624 | 8/2011 |
| WO | 2011127027 | 10/2011 |
| WO | 2012040371 | 3/2012 |
| WO | 2012087954 | 6/2012 |
| WO | 2012128895 | 9/2012 |
| WO | 2012170902 | 12/2012 |
| WO | 2012177866 | 12/2012 |
| WO | 2013122907 | 8/2013 |
| WO | 2013188429 | 12/2013 |
| WO | 2014059319 | 4/2014 |
| WO | 2014176343 | 10/2014 |
| WO | 2014179218 | 11/2014 |
| WO | 2014182764 | 11/2014 |
| WO | 2015005957 | 1/2015 |
| WO | 2015023589 | 2/2015 |

OTHER PUBLICATIONS

Goerg et al., "How Many Millenials Visit YouTube? Estimating Unobserved Events from Incomplete Panel Data Conditioned on Demographic Covariates," Apr. 27, 2015, 27 pages, Google Inc.

Goerg et al., "How Many People Visit YouTube? Imputing Missing Events in Panels with Excess Zeros," 2015, 6 pages, Google Inc.

IP Australia, "Examination Report No. 2," issued in connection with Australian Patent Application No. 2014370451, dated Jun. 19, 2017, 3 pages.

Slagell et al., "Sharing Computer Network Logs for Security and Privacy: A Motivation for New Methodologies of Anonymization", IEEE, Sep. 5, 2005, 10 pages.

Japanese Patent Office, "Notice of Allowance," issued in connection with Japanese Patent Application No. 2016-535132, dated Jul. 25, 2017, 4 pages.

Adam et al., "Privacy Preserving Integration of Health Care Data," AMIA 2007 Symposium Proceedings, Chicago, IL, Nov. 10-14, 2007, 5 pages.

Albanesius, Chloe, "Facebook Issues Fix for Several Tracking Cookies," Internet article, http://www.pcmag.com/article2/0,2817,2393750,00.asp, Sep. 28, 2011, 2 pages.

Coffey, Steve, "Internet Audience Measurement: A Practitioner's View," Journal of Interactive Advertising, vol. 1, No. 2, Spring 2001, 8 pages.

(56) References Cited

OTHER PUBLICATIONS

Cubrilovic, Nik, "Logging out of Facebook is not enough," Internet article, https://www.nikcub.com/pos ts/logging-out-of-facebook-is-not-enough/, on Sep. 25, 2011, 3 pages.
Fliptop, "Fliptop Person API Documentation," https://developer.fliptop.com/documentation, retrieved on May 7, 2013, 6 pages.
Fliptop, "Get, Keep and Grow Customers with Fliptop's Customer Intelligence Application," https://www.fliptop.com/features#social_matching, retrieved on May 7, 2013, 3 pages.
Fliptop, "What is Fliptop?" https://www.fliptop.com/about_us, retrieved on May 7, 2013, 1 page.
JavaScript and AJAX Forum, Sep. 28, 2005, retrieved from [URL: http://www.webmasterworld.com/forum91/4465.htm] on Jun. 29, 2011, 4 pages.
Launder, William, "Media Journal: Nielsen to Test Online-TV Viewing Tool," The Wall Street Journal, Internet article, http://blogs.wsj.com/corporate-intelligence/2013/04/30/media-journal-nielsen-to-test-online-tv-viewing-tool/, Apr. 30, 2013, 2 pages.
Wikipedia, "Mental Poker," Jan. 12, 2010, http://en.wikipedia.org/wiki/Mental_poker, retrieved on Sep. 21, 2010, 5 pages.
The Nielsen Company, "Nielsen Unveils New Online Advertising Measurement," Sep. 27, 2010, http://nielsen.com/us/en/press-room/2010/nielsen_unveils_newonlineadvertisingmeasurement.html, retrieved on May 31, 2012, 3 pages.
Protalinski, Emil, "Facebook Denies Cookie Tracking Allegations," Internet article, http://www.zdnet.com/article/facebook-denies-cookie-tracking-allegations/, Sep. 25, 2011, 2 pages.
Protalinski, Emil, "Facebook Fixes Cookie Behavior After Logging Out," Internet article, http://www.zdnet.com/article/facebook-fixes-cookie-behavior-after-logging-out/, Sep. 27, 2011, 2 pages.
Protalinski, Emil, "US Congressmen ask FTC to Investigate Facebook Cookies," Internet article, http://www.zdnet.com/article/us-congressmen-ask-ftc-to-investigate-facebook-cookies/, Sep. 28, 2011, 2 pages.
Rainier, Maria, "Why Businesses Should Use Google Plus," The Social Media Guide, thesocialmediaguide.com/social-media/why-businesses-should-use-google-plus, retrieved on May 7, 2013, 9 pages.
Rapleaf, "Fast. Simple. Secure," www.rapleaf.com/why-rapleaf/, retrieved on May 7, 2013, 3 pages.
Rapleaf, "Frequently Asked Questions," www.rapleaf.com/about-us/faq/#where, retrieved on May 7, 2013, 3 pages.
Rapleaf, "The Consumer Data Marketplace," www.rapleaf.com/under-the-hood/, retrieved on May 7, 2013, 2 pages.
Sharma, Amol, "Nielsen Gets Digital to Track Online TV Viewers," The Wall Street Journal, Internet article, http://www.wsj.com/articles/SB10001424127887323798104578453291286696164, Apr. 30, 2013, 3 pages.
Vega, Tanzina, "Nielsen Introduces New Ad Measurement Product," The New York Times, Internet article, http://mediadecoder.blogs.nytimes.com/2010/09/27/nielsen-unveils-new-ad-measurement-product/?_r=0, on Sep. 27, 2010, 2 pages.
Vranica, Suzanne, "Nielsen Testing a New Web-Ad Metric," The Wall Street Journal, Internet article, http://www.wsj.com/articles/SB10001424052748704814204575508100589715696, on Sep. 23, 2010, 3 pages.
Patent Cooperation Treaty, "International Search Report," issued by the International Searching Authority in connection with PCT application No. PCT/US2014/036298, dated Aug. 12, 2015, 3 pages.
Patent Cooperation Treaty, "Written Opinion of the International Searching Authority," issued by the International Searching Authority in connection with PCT Application No. PCT/US2014/036298 dated Aug. 12, 2015, 6 pages.
Intellectual Property Australia, "Notice of Acceptance," issued in connection with Australian Patent Application No. 2014370451, dated Oct. 4, 2017, 3 pages.
State Intellectual Property Office of China, "First Notification of Office Action," issued in connection with Chinese Patent Application No. 201480070313.2, dated Apr. 3, 2018, 16 pages.
European Patent Office, "Examination Report," issued in connection with European Patent Application No. 14875492.2, dated May 6, 2018, 6 pages.
European Patent Office, "Extended European Search Report," issued in connection with European Patent Application No. 14875492.2, dated Oct. 5, 2017, 8 pages.
Canadian Intellectual Property Office, "Office Action," issued in connection with Canadian Patent Application No. 2,932,235, dated Jan. 10, 2018, 4 pages.
European Patent Office, "Communication Under Rule 71(3) EPC," issued in connection with European patent application No. 19163955.8, dated May 20, 2020, (64 pages).
Canadian Intellectual Property Office, "Commissioner's Notice— Application Found Allowable," issued in connection with Canadian Patent Application No. 2,932,235, dated Jan. 10, 2020, (1 page).
Australian Patent Office, "First Examination Report," issued in connection with Australian Patent Application No. 2018200343, dated Nov. 14, 2018, 2 pages.
Candian Patent Office, "Examination Search Report," issued in connection with Canadian Patent Application No. 2,932,235, dated Dec. 6, 2018, 4 pages.
European Patent Office, "Decision to Grant a European Patent Pursuant to Article 97(1) EPC," issued in connection with European Patent Application No. 14875492.2, dated Mar. 28, 2019, 2 pages.
State Intellectual Property Office of China, "Second Notification of Office Action," issued in connection with Chinese Patent Application No. 201480070313.2, dated Dec. 4, 2018, 19 pages.
European Patent Office, "European Search Report" issued in connection with European Application No. 19163955.8 dated Jul. 22, 2019, 9 pages.
Patent Cooperation Treaty, "International Preliminary Report on Patentability," issued by the International Searching Authority in connection with PCT Application No. PCT/US2014/036298 dated Jun. 28, 2016, 7 pages.
Canadian Intellectual Property Office, "Office Action," issued in connection with Canadian Patent Application No. 2,932,235, dated Jan. 27, 2017, 4 pages.
China National Intellectual Property Administration, "Notice of Decision of Granting Patent Right for Invention" issued in connection with Chinese Application No. 201480070313.2, dated May 7, 2019, 5 pages.
IP Australia, "Notice of Acceptance," issued in connection with Australian Application No. 2018200343, dated May 1, 2019, 3 pages.
European Patent Office., "Search Report," issued in connection with European patent application No. 20198038, dated Jan. 13, 2021, (11 pages).

* cited by examiner

METHODS AND APPARATUS TO MEASURE MEDIA USING MEDIA OBJECT CHARACTERISTICS

RELATED APPLICATION

This patent arises from a continuation of International PCT Patent Application No. PCT/US14/36298, filed on May 1, 2014, and claims priority to U.S. Provisional Patent Application No. 61/920,048, filed on Dec. 23, 2013, which are hereby incorporated herein by reference in their entireties.

FIELD OF THE DISCLOSURE

The present disclosure relates generally to monitoring media and, more particularly, to methods and apparatus to measure media using media object characteristics.

BACKGROUND

Traditionally, audience measurement entities determine audience engagement levels for media programming based on registered panel members. That is, an audience measurement entity enrolls people who consent to being monitored into a panel. The audience measurement entity then monitors those panel members to determine media programs (e.g., television programs or radio programs, movies, DVDs, etc.) exposed to those panel members. In this manner, the audience measurement entity can determine exposure metrics for different media based on the collected media measurement data.

Techniques for monitoring user access to Internet resources such as web pages, advertisements and/or other Internet-accessible media have evolved significantly over the years. Some known systems perform such monitoring primarily through server logs. In particular, entities serving media on the Internet can use known techniques to log the number of requests received for their media (e.g., content and/or advertisements) at their server.

DETAILED DESCRIPTION

Figure 1:
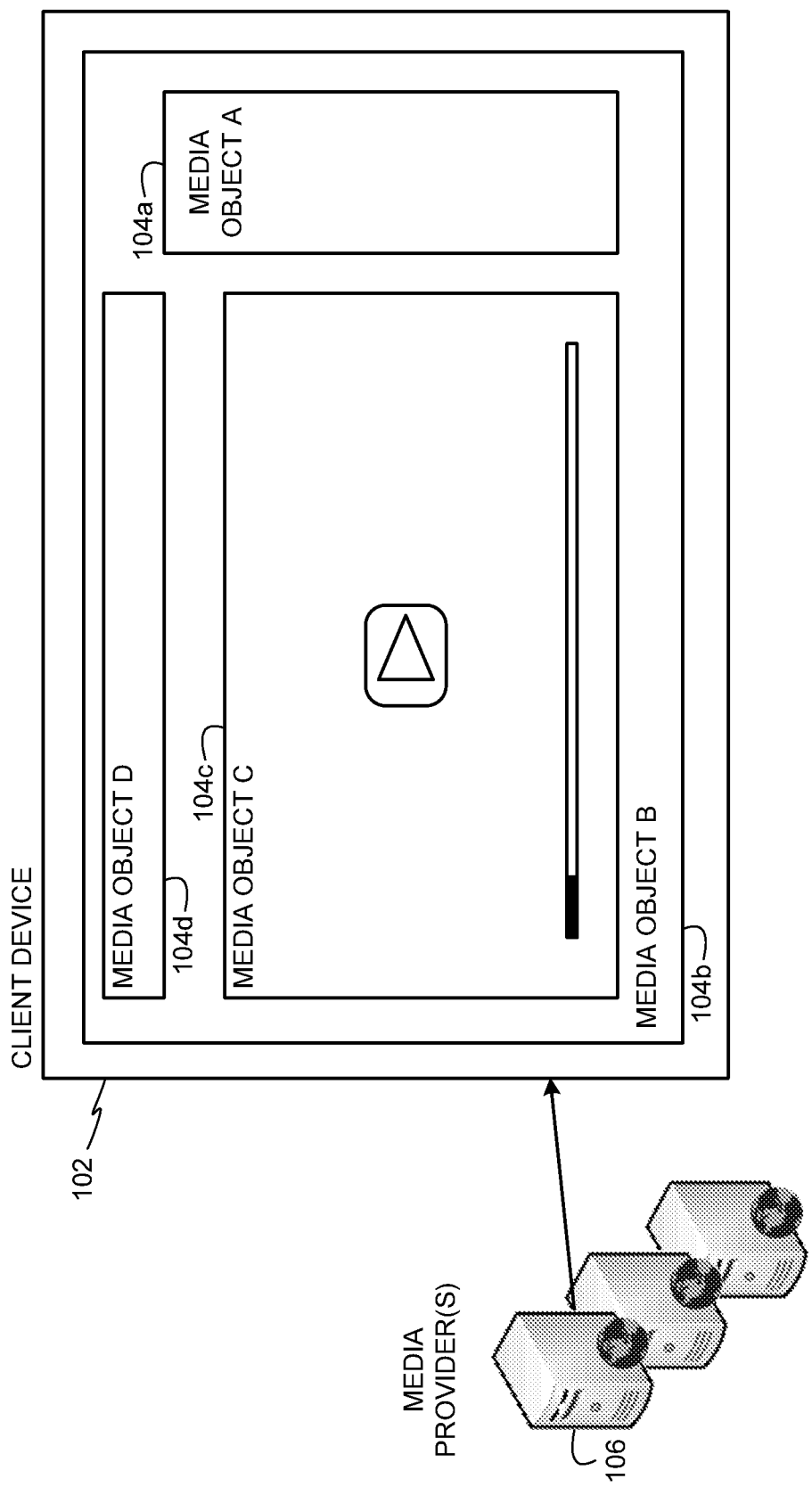
FIG. 1 depicts an example client device user interface that is presenting a plurality of media objects.

Techniques for monitoring user access to Internet-accessible media such as web pages, advertisements, content and/or other media has evolved significantly over the years. At one point in the past, such monitoring was done primarily through server logs. In particular, entities serving media on the Internet would log the number of requests received for their media at their server. Basing Internet usage research on server logs is problematic for several reasons. For example, server logs can be tampered with either directly or via zombie programs which repeatedly request media from the server to increase the server log counts. Secondly, media is sometimes retrieved once, cached locally and then repeatedly viewed from the local cache without involving the server in the repeat viewings. Server logs cannot track these views of cached media. Thus, server logs are susceptible to both over-counting and under-counting errors.

The inventions disclosed in Blumenau, U.S. Pat. No. 6,108,637, fundamentally changed the way Internet monitoring is performed and overcame the limitations of the server side log monitoring techniques described above. For example, Blumenau disclosed a technique wherein Internet media to be tracked is tagged with beacon instructions. In particular, monitoring instructions are associated with the HTML of the media to be tracked. When a client requests the media, both the media and the beacon instructions are downloaded to the client. The beacon instructions are, thus, executed whenever the media is accessed, be it from a server or from a cache.

The beacon instructions cause monitoring data reflecting information about the access to the media to be sent from the client that downloaded the media to a monitoring entity. Typically, the monitoring entity is an audience measurement entity (AME) that did not provide the media to the client and who is a trusted (e.g., neutral) third party for providing accurate usage statistics (e.g., The Nielsen Company, LLC). Advantageously, because the beaconing instructions are associated with the media and executed by the client browser whenever the media is accessed, the monitoring information is provided to the AME irrespective of whether the client is a panelist of the AME.

Audience measurement entities and/or other businesses often desire to link demographics to the monitoring information. To address this issue, the AME establishes a panel of users who have agreed to provide their demographic information and to have their Internet browsing activities monitored. When an individual joins the panel, they provide detailed information concerning their identity and demographics (e.g., gender, age, ethnicity, income, home location, occupation, etc.) to the AME. The audience measurement entity sets a cookie on the panelist computer that enables the audience measurement entity to identify the panelist whenever the panelist accesses tagged media and, thus, sends monitoring information to the audience measurement entity.

Since most of the clients providing monitoring information from the tagged media are not panelists and, thus, are unknown to the audience measurement entity, it is necessary to use statistical methods to impute demographic information based on the data collected for panelists to the larger population of users providing data for the tagged media. However, panel sizes of audience measurement entities remain small compared to the general population of users. Thus, a problem is presented as to how to increase panel sizes while ensuring the demographics data of the panel is accurate.

There are many database proprietors operating on the Internet. These database proprietors provide services to large numbers of subscribers. In exchange for the provision of the service, the subscribers register with the proprietor. As part of this registration, the subscribers provide detailed demographic information. Examples of such database proprietors include social network providers, email providers, etc. such as Facebook, Myspace, Twitter, Yahoo!, Google, etc. These database proprietors set cookies on the computers of their subscribers to enable the database proprietor to recognize the user when they visit their website.

The protocols of the Internet make cookies inaccessible outside of the domain (e.g., Internet domain, domain name, etc.) on which they were set. Thus, a cookie set in the amazon.com domain is accessible to servers in the amazon.com domain, but not to servers outside that domain. Therefore, although an audience measurement entity might find it advantageous to access the cookies set by the database proprietors, they are unable to do so.

Another drawback of prior beaconing processes is that each beacon request corresponds to a single piece of tagged media rendered or presented via a client computer (e.g., via a web browser, an application, etc.). As such, impression information is often not collected about other media co-located on a web page or simultaneously presented by a web browser. Such prior beaconing processes provide a limited understanding of Internet-accessible media to which users are exposed. For example, a beacon request of prior beaconing processes may indicate a host web page address and a media identifier of one media item presented on that host web page. However, this provides no information about what other media was presented on the host web page. Thus, no correlations or causal relationships between different media on a web page can be measured with such prior beaconing processes. For example, a user may visit a social network web page that serves as a portal to access movie trailers. The portal may also display a tagged banner advertisement in addition to the movie trailers. While the tagged banner advertisement may cause a client computer to send a beacon request that includes an advertisement identifier for the tagged banner advertisement and the URL for the host web page URL, the beacon request will not convey any information about the concurrently displayed movie trailer.

As such, the host web page will get full credit for causing the impression of the tagged banner advertisement, but the displayed movie trailer will get no credit as being a cause for drawing a user's attention that facilitated displaying the tagged banner advertisement. Examples disclosed herein extend the data collection process so that beacon requests convey information to the AME about numerous media objects concurrently presented on a client device.

Examples disclosed herein enable an AME to leverage information or characteristics about numerous media objects concurrently displayed at a client device so that the AME can simultaneously log impressions for the numerous media objects concurrently presented at the client device. Examples disclosed herein also enable determining causal relationships between the numerous presented media objects. Examples disclosed herein also enable an AME to leverage existing databases of database proprietors to collect more extensive Internet usage and demographic data by extending the beaconing process to encompass participating database proprietors and by using such database proprietors as interim data collectors.

Examples disclosed herein involve tagging media objects (e.g., advertisements, product images (e.g., for e-commerce, online purchasing, etc.), television programming, news stories, etc.), that are delivered via the Internet, by embedding instructions (e.g., collector instructions and beacon instructions) into the media objects. Collector instructions and beacon instructions are executed by client devices when the client devices reproduce the received media objects for display or playback. When a client device executes the collector instructions and beacon instructions, the collector instructions and beacon instructions cause the client device to collect characteristics of presented media objects and send the collected characteristics in a beacon request to a collection facility. The collector instructions collect media object characteristics (e.g., embedded identifiers, embedded codes, embedded information, signatures, etc.) from media objects so that the collection facility can identify the media objects and related information based on the characteristics. In some examples, media object characteristics provide information such as program title, serving domain, host website address (uniform resource locator (URL)), media owner, ad campaign identifier, product name, product manufacturer, etc. In this manner, beacon requests and media object parameters enable the collection facility to log impressions for corresponding media objects as those media objects are presented at client devices.

Examples disclosed herein facilitate using a single communication from a client device to communicate multiple impressions to a collection facility about multiple media objects presented concurrently at a client device. When multiple media objects are rendered on a display of a client device or otherwise presented by the client device, one of the media objects is designated as a master or collector media object that includes collector instructions and beacon instructions (e.g., a master tag that includes such instructions). The collector media object operates to collect media object characteristics from all of the other media objects being concurrently presented at the client device. In this manner, instead of all of the concurrently presented media objects sending corresponding beacon requests to the collection facility, the collector media object sends a single beacon request with all of the collected media object information from all of the other presented media objects. This significantly reduces the amount of network bandwidth and communication resources required by the client device to report on the concurrently presented media objects to the collection facility. In addition, this enables determining relationships (e.g., causal relationships) between the different media objects.

The reporting of media object parameters for multiple simultaneously displayed media objects enables crediting multiple entities with causation of ad/media impressions. For example, if a media clip (a media object) of the television show "Breaking Bad" is accessed by a user as embedded media via a socialnetwork.com web page, and the web page also simultaneously displays numerous tagged ads (media objects), a master tag in one of the media objects collects media object parameters of the "Breaking Bad" clip and of the displayed ads. The master tag then sends a beacon request with all the collected media object parameters to the collection facility. The collected parameters for all of the media objects enable logging impressions for the displayed ads and awarding causal credit to both the "Breaking Bad" clip and the socialnetwork.com web page to indicate that both the "Breaking Bad" clip and the socialnetwork.com web page drew the users attention to enable the displayed ads to be served on the same web page.

Examples disclosed herein may be implemented by an audience measurement entity (e.g., any entity interested in measuring or tracking audience exposures to advertisements, content, and/or any other media) in cooperation with any number of database proprietors such as online web services providers. Such database proprietors/online web services providers may be social network sites (e.g., Facebook, Twitter, MySpace, etc.), multi-service sites (e.g., Yahoo!, Google, Experian, Axiom, Catalina, etc.), online retailer sites (e.g., Amazon.com, Buy.com, etc.), and/or any other web service(s) site that maintains user registration records.

To increase the likelihood that measured viewership is accurately attributed to the correct demographics, examples disclosed herein use demographic information located in the audience measurement entity's records as well as demographic information located at one or more database proprietors that maintain records or profiles of users having accounts therewith. In this manner, examples disclosed herein may be used to supplement demographic information maintained by a ratings entity (e.g., an AME such as The Nielsen Company of Schaumburg, Ill., United States of America, that collects media exposure measurements and/or demographics) with demographic information from one or more different database proprietors.

Examples disclosed herein enable a client device to send a single beacon request to an AME to report multiple media objects presented at the client device. In this manner, by using a single beacon request to report multiple media objects, the AME can log a significant number of impressions for media objects presented on a client device while receiving relatively few communications from a client device notifying of the presented media objects. In addition, examples disclosed herein enable logging relationships between the different media objects. As used herein, an impression is defined to be an event in which a home or individual is exposed to the corresponding media (e.g., content and/or advertisement). Thus, an impression represents a home or an individual having been exposed to media (e.g., an advertisement, content, a group of advertisements and/or a collection of content). In Internet advertising, a quantity of impressions or impression count is the total number of times media (e.g., an advertisement or advertisement campaign) has been accessed by a web population (e.g., the number of times the media is accessed as decreased by, for example, pop-up blockers and/or increased by, for example, retrieval from local cache memory). As used herein, a demographic impression is defined to be an impression that is associated with a characteristic (e.g., a demographic characteristic) of the person exposed to the media.

FIG. 1 depicts an example client device 102 that is configured to present a plurality of media objects 104a-d via a user interface. The client device 102 of the illustrated example may be any device capable of accessing media over a network. For example, the client device 102 may be a computer, a tablet, a mobile device, a smart television, or any other Internet-capable device or appliance. Examples disclosed herein may be used to collect impression information for any type of media including content and/or advertisements. Media objects, such as the media objects 104a-d, may include web pages, streaming video, streaming audio, internet protocol television (IPTV) content, movies, television programming and/or other programming, and such media objects are generally referred to herein as content. In some examples, the media objects 104a-d include user-generated media that is, for example, uploaded to media upload sites such as YouTube and subsequently downloaded and/or streamed by many client devices for playback. Media objects, such as the media objects 104a-d, may also include advertisements. Advertisements are typically distributed with content. Traditionally, content is provided at little or no cost to the audience because it is subsidized by advertisers that pay to have their advertisements distributed with the content. As used herein, "media" refers collectively and/or individually to content and/or advertisement(s).

In the illustrated example of FIG. 1, the media objects A 104a and D 104d are advertisements, the media object B 104b is a host web page, and the media object C 104c is a video. In other examples, the media objects 104a-d may be used to present any other media. For example, the media object B 104b could be a website, a portal, a web app, etc. in which the media object A 104a is an informational panel that displays facts or other information (e.g., statistics about a sports team or athlete, information or reviews about a movie or television program, etc.) about a video presented in the media object C 104c (e.g., a sports video, a movie, a television program, a news program, etc.). Examples disclosed herein may be used to collect impression information about multiple media objects (e.g., media objects A, B, C, and D) concurrently presented at client devices so that the impression information can be used to determine relationships between different media concurrently presented to users via client devices. Such relationships may be causal relationships indicating that an impression to a particular media object, such as an advertisement, may be a result of a person visiting a particular website (e.g., identified by a corresponding URL) or viewing a particular streaming television channel (e.g., identified by a channel number or network name) to access a particular television program or other media. In this manner, causal credits can be awarded to the visited website or streaming television channel and to the accessed television program or media (e.g., content) as drawing the user's attention to create an opportunity for presenting other media (e.g., an advertisement media object).

In the illustrated example, the media objects 104a-d are provided to the client device 102 by one or more media provider(s) 106. In the illustrated example, the media provider(s) 106 may be media providers (e.g., content providers), media publishers, and/or advertisers that distribute the media objects 104a-c via the Internet to users that access websites and/or online television services (e.g., web-based TV, Internet protocol TV (IPTV), etc.). The media objects 104a-c may additionally or alternatively be distributed through broadcast television services to traditional non-Internet based (e.g., RF, terrestrial or satellite based) television sets that are monitored for viewership using the techniques disclosed herein and/or other techniques.

Although a single client device 102 is shown in the illustrated example of FIG. 1, examples disclosed herein are usable to collect impression information from multiple client devices concurrently in use by a user. For example, the client device 102 may be a tablet device that operates as a second screen to view supplemental media (e.g., advertisements, character/actor biographies, behind the scene footage, director commentaries, etc.) when a user is also watching related, primary media (e.g., a television show, a movie, etc.) via a primary screen such as a television. Examples disclosed herein facilitate collecting impression information from both the primary and secondary screens and analyzing the impression information in connection with demographic information of the same user of both the primary and secondary screens. For example, the primary and secondary screen devices may both store a same identifier that can be used to identify the user and/or demographic information associated with those devices. As such, impressions can be logged for both of those devices based on the same identifier to correlate the same demographic information with all of the impressions logged in connection with that identifier. Alternatively, the primary and secondary screens may have different, respective identifiers that are both used to identify the same user and/or demographic information associated with the primary and secondary devices. As such, impressions can be logged for both of the devices based on the respective identifiers to correlate the same demographic information with all of the impressions logged in connection with the primary and secondary devices.

Figure 12:
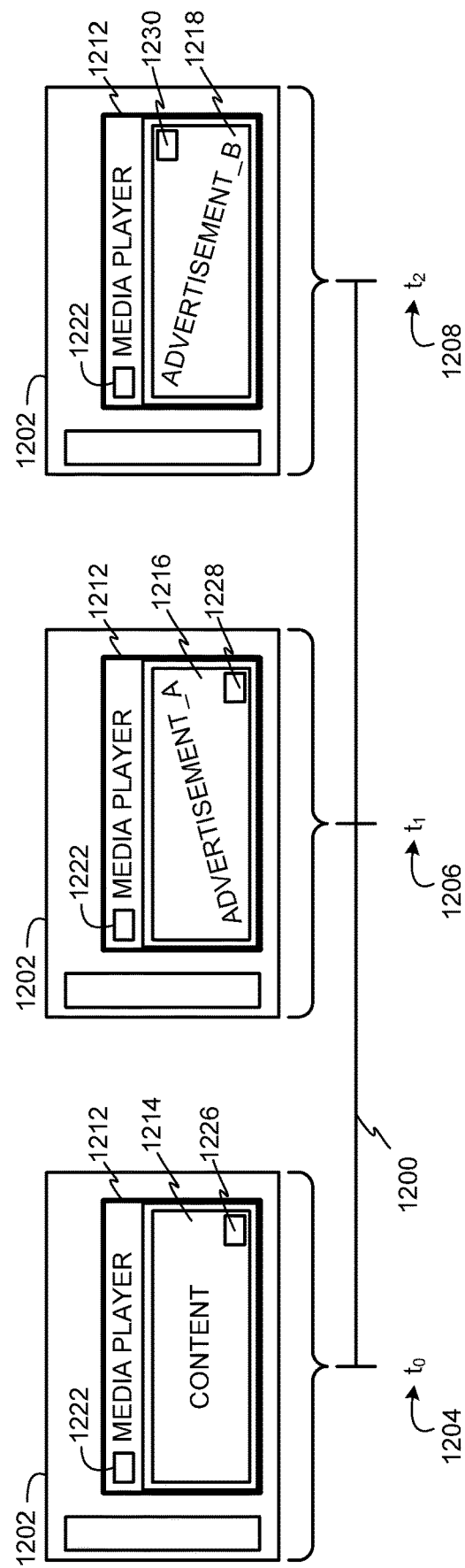
FIG. 12 depicts an example web page interface displaying a media player to present sequential media objects including content and advertisements.

In the illustrated example of FIG. 1, the media objects 104a, 104c, and 104d are embedded media objects embedded in the media object B 104b (e.g., a container media object). The media objects 104a, 104c, and 104d of the illustrated example are juxtaposed media objects. Examples disclosed herein may also be used in connection with sequential media objects as shown in the illustrated example of FIG. 12. For example, sequential media objects are objects that are presented in a sequential manner (e.g., in seriatim). For example, FIG. 12 shows a timeline 1200 and a web page media object 1202 showing sequential media objects at different times $t_0$ 1204, $t_1$ 1206 and $t_2$ 1208 along the timeline 1200. In the illustrated example of FIG. 12, the web page media object 1202 displays a media player media object 1212 that presents a content media object 1214 at time $t_0$ 1204, a first advertisement (ADVERTISEMENT_A) media object 1216 at time $t_1$ 1206, and a second advertisement (ADVERTISEMENT_B) media object 1218 at time $t_2$ 1208. In the illustrated example, the content 1214, the first advertisement 1216, and the second advertisement 1218 are presented sequentially in that they do not appear concurrently in the media player media object 1212 at the same time. In addition, the media player media object 1212 of the illustrated example is a container object in which the content 1214, the first advertisement 1216, and the second advertisement 1218 are embedded media objects in the media player media object 1212. In some examples, a video (e.g., a movie, a television program, a sporting event stream or video, a news program, etc.) displayed in the media player media object 1212 is the container object, and the advertisements 1216 and 1218 are embedded media objects in the video container object. Examples disclosed herein may be used to monitor and measure sequential media objects such as the content 1214, the first advertisement 1216, and the second advertisement 1218, juxtaposed media objects such as the media objects 104a, 104c, and 104d of FIG. 1, and embedded media objects such as the media objects 104a, 104c, and 104d of FIG. 1 embedded in the media object 104b, and such as the content 1214, the first advertisement 1216, and the second advertisement 1218 of FIG. 12 embedded in the media player media object 1212.

Figure 2:
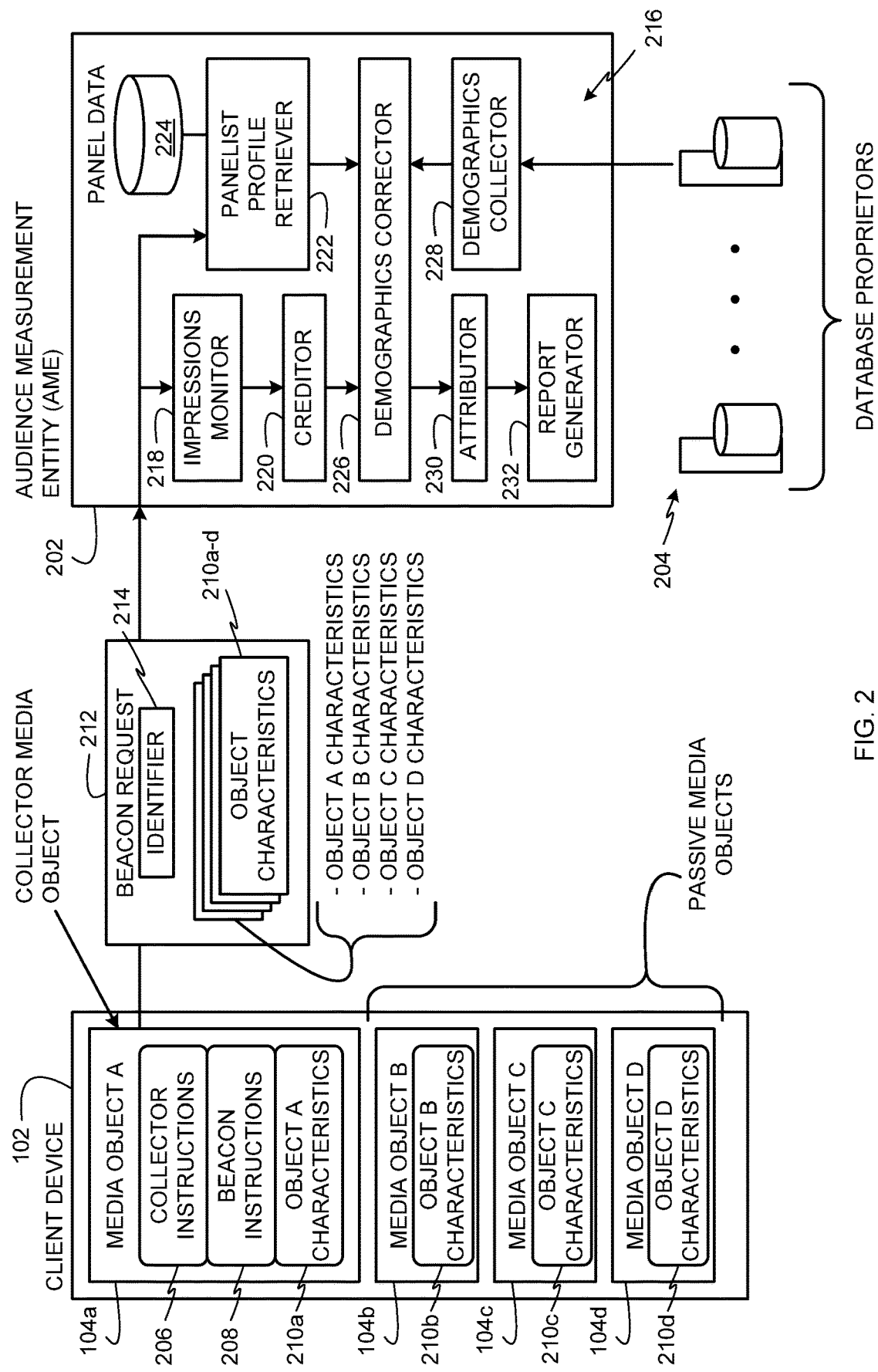
FIG. 2 depicts an example system that may be used to associate media impressions with user demographic information based on characteristics of the media objects of FIG. 1 and demographics information distributed across numerous database proprietors.

FIG. 2 depicts an example system 200 in which an AME 202 may associate media impressions with user demographic information based on characteristics of the media objects 104a-d of FIG. 1 and distributed demographics information located across numerous database proprietors 204. "Distributed demographics information" is used herein to refer to demographics information obtained from at least two sources, at least one of which is a database proprietor 204 such as an online web services provider. In examples disclosed herein, database proprietors 204 maintain user account records corresponding to users registered for Internet-based services provided by the database proprietors. Demographic information may include, for example, gender, age, ethnicity, income, home location, education level, occupation, etc.

In the illustrated example, to facilitate sending impression information about numerous ones of the media objects 104a-d from the client device 102 to the AME 202, at least one of the media objects 104a-d is configured as a collector object, and others of the media objects 104a-d are configured as passive objects. In the illustrated example, collector object is a media object that operates to collect media object characteristics from all of the other media objects being concurrently presented at the client device 102. In the illustrated example, a passive object is a media object having characteristics that are collected by a collector object for sending to an AME during an impression reporting process. In the illustrated example, the media object A 104a is a collector object, and the media objects 104b-d are passive objects. The media object A 104a of the illustrated example includes collector instructions 206 and beacon instructions 208. In the illustrated example, the instructions 206 and 208 form a master tag. A master tag in the illustrated example is embedded in a media object so that the media object can operate as a collector object. For example, in FIG. 2 a master tag having the instructions 206 and 208 is provided to the media object A 104a so that the media object A 104a can operate as a collector object. In addition, all of the media objects 104a-d of the illustrated example include object characteristics 210a-d. As the collector object, the media object A 104a collects object characteristics from itself and from the other media objects 104b-d to send the collected object characteristics to the AME 202. To accomplish this process, the collector instructions 206, when executed, cause the client device 102 to collect the object characteristics 210a-d from the media objects 104a-d. In addition, the beacon instructions 208, when executed, cause the client device 102 to send the object characteristics 210a-d in a beacon request 212 to the AME 202.

In some examples, a media object called by a user is a master object (e.g., the media object A 104a) and media objects called by the master object are designated as subordinate objects (e.g., the media objects 104b-d). In some examples, subordinate objects can become master objects relative to other media objects. For example, a media object called by another media object is a subordinate object relative to the media object that called it. As such, a subordinate object (e.g., a first-level subordinate object) may become a master object relative to another subordinate object (e.g., a second-level subordinate object).

As discussed above in connection with FIG. 1, the media objects 104*a*, 104*c*, and 104*d* are juxtaposed media objects relative to one another and are embedded objects in the media object 104*b*. Examples disclosed herein may also be used in connection with sequential media objects such as the content media object 1214, the advertisement (ADVERTISEMENT_A) media object 1216, and the advertisement (ADVERTISEMENT_B) media object 1218 of FIG. 12. In the illustrated example of FIG. 12, to facilitate collecting media object characteristics corresponding to the content media object 1214, the advertisement (ADVERTISEMENT_A) media object 1216, and the advertisement (ADVERTISEMENT_B) media object 1218, the media player media object 1212 is provided with a master tag 1222 having collector and beacon instructions (e.g., similar or identical to the collector instructions 206 and beacon instructions 208 of FIG. 2). In addition, the content media object 1214 is provided with object characteristics 1226, the advertisement (ADVERTISEMENT_A) media object 1216 is provided with object characteristics 1228, and the advertisement (ADVERTISEMENT_B) media object 1218 is provided with object characteristics 1230. In the illustrated example, the media player media object 1212 remains presented as a container object (e.g., remains instantiated and/or displayed) at times 1204, 1206, and 1208 as shown in FIG. 12 while the embedded sequential media objects 1214, 1216, and 1218 are sequentially presented in the media player media object 1212. Since the media player media object 1212 remains presented, collector instructions in the master tag 1222 of the media player media object 1212 collect the object characteristics 1226 when the content media object 1214 is presented at time $t_0$ 1204, collect the object characteristics 1228 when the advertisement (ADVERTISEMENT_A) media object 1216 is presented at time $t_1$ 1206, and collect the object characteristics 1230 when the advertisement (ADVERTISEMENT_B) media object 1218 is presented at time $t_2$ 1208. The beacon instructions of the master tag 1222 can then send the collected object characteristics 1226, 1228, and 1230 to the AME 202.

In some examples, the master tag 1222 is provided in the content media object 1214, and the content media object 1214 is the container object that remains instantiated or loaded (e.g., in the background) when the advertisement media objects 1216 and 1218 are presented. In such examples, collector instructions in the master tag 1222 of the content media object 1214 collect the object characteristics 1226 when the content media object 1214 is presented at time $t_0$ 1204, collect the object characteristics 1228 when the advertisement (ADVERTISEMENT_A) media object 1216 is presented at time $t_1$ 1206, and collect the object characteristics 1230 when the advertisement (ADVERTISEMENT_B) media object 1218 is presented at time $t_2$ 1208. Beacon instructions in the master tag 1222 of the content media object 1214 then send the collected object characteristics 1226, 1228, and 1230 to the AME 202.

In the illustrated example, the collector instructions 206 and the beacon instructions 208 are computer executable instructions (e.g., Java, javascript, or any other computer language or script) embedded in the media object A 104*a* by the creator of the media object A 104*a* and/or another entity (e.g., a subsequent media distributor or publisher such as the media provider(s) 206 of FIG. 1). In some examples, instead of embedding the collector instructions 206 and the beacon instructions 208 in the media object A 104*a*, one or more hyperlink(s) is instead provided in the media object A 104*a* to direct a web browser to download or retrieve the collector instructions 206 and the beacon instructions 208 from one or more specified servers. This enables, for example, the AME 202 to change the instructions without involving the media provider of the media object A 104*a*. In some examples, the instructions 206 and 208 are executed by a web browser that is presenting the media objects 104*a-d*. In other examples, the instructions are executed by an application (or an "app" on a mobile device) that is presenting the media objects 104*a-d*. In yet other examples, the instructions are executed as independent programs. For example, a smart television may execute the instructions as separate programs. In the illustrated example, the media object A 104*a* is referred to as being tagged with a master tag that includes the collector instructions and the beacon instructions 208.

The object characteristics 210*a-d* may be information embedded in the media objects 104*a-d*. In some examples, instead of embedding the object characteristics 210*a-d* in the media objects 104*a-d*, one or more hyperlink(s) are instead provided in the media objects 104*a-d* to direct a web browser to download or retrieve the object characteristics 210*a-d* from one or more specified servers. This enables, for example, the AME 202 to change the object characteristics 210*a-d* without involving the media provider of the media objects 104*a-d*. In some examples, the embedded information may be one or more of identification codes (e.g., metadata) that identify associated media, campaign identifiers (IDs) that identify associated ad campaigns, a creative type ID (e.g., identifying Flash-based media or ads, banner ads, rich type ads, etc.), a source ID (e.g., identifying the media publisher), and a placement ID (e.g., identifying the physical placement of the media on a screen). In some examples, the object characteristics 210*a-d* are derived from visual and/or audible characteristics of the media objects 104*a-d*. For example, the collector instructions 206 may be configured to cause the client device 102 to generate video, image, or audio signatures from portions of the media objects 104*a-d*. For example, the collector instructions 206 may cause the client device 102 to perform a screen capture or a screen scan to collect an image or images representative of the media objects 104*a-d* and generate signatures corresponding to the media objects 104*a-d* based on the image(s). Additionally or alternatively, the collector instructions 206 may cause the client device 102 to intercept and/or capture audio of the media object(s) 104*a-d* and generate one or more signatures corresponding to the media object(s) 104*a-d* based on the audio. In this manner, the AME 202 can use a collected signature from one of the media objects 104*a-d* to identify the one of the media objects 104*a-d* based on a matching reference signature stored at the AME 202. In some examples, the collector instructions 206 may cause the client device 102 to perform optical character recognition (e.g., text recognition) or logo recognition based on screen capture images and use recognized text and/or logos associated with the media objects 104*a-d* as part of the object characteristics 210*a-d*.

After collecting the object characteristics 210*a-d* based on the collector instructions 206, execution of the beacon instructions 208 causes the client device 102 to send a beacon request 212 to a server (e.g., an Internet protocol (IP) address or URL) of the AME 202 specified in the beacon instructions 208. In the illustrated example, the beacon instructions 208 cause the client device 102 to locate an identifier 214 and the object characteristics 210*a-d* in the beacon request 212. The beacon request 212 of the illustrated example is an impression request that causes the AME 202 to log impressions for the media objects 104*a-d*. In the illustrated example, an impression request is a reporting to the AME 202 of an occurrence of a media object being presented at the client device 102. The beacon/impression request 212 may be implemented as a hypertext transfer protocol (HTTP) request. However, whereas a transmitted HTTP request identifies a webpage or other resource to be downloaded, the beacon/impression request 212 includes audience measurement information (e.g., the object characteristics 210*a-d* and the identifier 214) as its payload. The server to which the beacon/impression request 212 is directed is programmed to log the audience measurement information of the beacon/impression request 212 as an impression (e.g., a media impression such as advertisement and/or content impressions depending on the nature of the media objects for which object characteristics are communicated in the beacon/impression request 212).

The identifier 214 of the illustrated example may be any identifier useful to associate demographic information with the user or users of the client device 102. In some examples, the identifier 214 may be a device identifier (e.g., an international mobile equipment identity (IMEI), a mobile equipment identifier (MEID), a media access control (MAC) address, etc.), a web browser unique identifier (e.g., a cookie), a user identifier (e.g., a user name, a login ID, etc.), an Adobe Flash® client identifier, identification information stored in an HTML5 datastore, or any other identifier that the AME 202 and/or database proprietors 204 store in association with demographic information about users of client devices. In this manner, when the AME 202 receives the identifier 214 in the beacon/impression request 212, the AME 202 can obtain demographic information corresponding to a user of the client device 102 based on the identifier 214 that the AME 202 receives in the beacon/impression request 212 from the client device 102. In some examples, the identifier 212 may be encrypted (e.g., hashed) at the client device 102 so that only an intended final recipient of the identifier 212 can decrypt the hashed identifier 212. For example, if the identifier 212 is a cookie that is set in the client device 102 by the AME 202, the identifier 212 can be hashed so that only the AME 202 can decrypt the identifier 212. If the identifier 212 is an IMEI number, the client device 102 can hash the identifier 212 so that only a wireless carrier (e.g., one of the database proprietors 204) can decrypt the hashed identifier 212 to recover the IMEI for use in accessing demographic information corresponding to the user of the client device 102. By hashing the identifier 214, an intermediate party receiving the beacon request cannot directly identify a user of the client device 102. For example, if the intended final recipient of the identifier 214 is one of the database proprietors 204, the AME 202 cannot recover identifier information when the identifier 214 is hashed by the client device 102 for decrypting only by the intended database proprietor 204.

The AME 202 of the illustrated example is provided with an example apparatus 216 to receive beacon requests (e.g., the beacon/impression request 212) and to log impressions and/or demographic impressions for different media objects (e.g., the media objects 104*a-d*) based on information (e.g., the identifier 214 and the object characteristics 210*a-d*) in the beacon requests. The example apparatus 216 is provided with an example impressions monitor 218, an example creditor 220, an example panelist profile retriever 222, an example panel database 224, an example demographics corrector 226, an example demographics collector 228, an example attributor 230, and an example report generator 232. The example impressions monitor 218, the example creditor 220, the example panelist profile retriever 222, the example panel database 224, the example demographics corrector 226, the example demographics collector 228, the example attributor 230, and the example report generator 232 may be configured as one or more apparatus in the AME 202.

The impressions monitor 218 of the illustrated example is provided to log impressions of media (e.g., impressions of the media objects 104*a-d*) based on received beacon/impression requests (e.g., the beacon/impression request 212). The creditor 220 of the illustrated example is provided to award causal credits to particular media objects (e.g., ones of the media objects 104*a-d*) that are responsible for drawing users' attention to create opportunities for presenting other media objects (e.g., others of the media objects 104*a-d*). For example, if media object B 104*b* of FIGS. 1 and 2 represents a web page and media object C 104*c* of FIGS. 1 and 2 represents a movie trailer video accessed by a user via the web page, the creditor 220 can award causal credits to the web page represented by media object B 104*b* and to the movie trailer video represented by media object C 104*c* because a user's attention was drawn to the web page based on the user's interest in accessing the movie trailer video. Both of the particular web page and the particular movie trailer video in which the user was interested drew the user's attention creating an opportunity to present other media (e.g., advertisements) represented by the media object A 104*a* and the media object D 104*d*. As such, the impressions logged by the impression monitor 218 can be further processed by the creditor 220 to determine which media objects should be awarded causal credits for drawing the attention of people resulting in the creation of opportunities to present advertisements or other media which may be supplemental or related to the people's interests.

While the above example is related to a media delivery context in which the media object C 104*c* is a movie trailer video, examples disclosed herein may be similarly used in other types of Internet media scenarios. For example, the media objects 104*a-d* of FIGS. 1 and 2 may be presented on an e-commerce web site (e.g., an online shopping site such as Amazon.com, ebay.com, or other online retailers), and the AME 202 may be interested in identifying retail products for sale that create opportunities to present supplemental/related media and/or advertisements. In such example scenarios, the media object B 104*b* of FIGS. 1 and 2 represents an online retailer web page, and the media object C 104*c* of FIGS. 1 and 2 represents a video about a product that a user is interested in purchasing from the online retailer. In such examples, both of the particular online retailer web page and the particular product in which the user was interested drew the user's attention creating an opportunity to present other media (e.g., advertisements) represented by the media object A 104*a* and the media object D 104*d*. In such examples, the creditor 220 awards causal credit to the media object B 104*b* and the media object C 104*c* for creating the presentation opportunity for other media (e.g., advertisements or other media) represented by the media object A 104*a* and the media object D 104*d*.

In examples associated with television delivery services, the client device 102 may be a smart television tuned to a particular channel represented by the media object B 104*b*. In such examples, a user is drawn to the particular channel to watch a television program represented by the media object C 104*c*. As such, the creditor 220 of the illustrated example of FIG. 2 awards causal credits to the tuned-to channel and the television program for creating the presentation opportunity for media (e.g., advertisements or other media) represented by the media object A 104*a* and the media object D 104*d*. Accordingly, examples disclosed herein can be used to award causal credit to media in the area of internet-based media delivery services, to award causal credit to products in the area of product-based e-commerce, and to award causal credit to media delivery networks or channels and television programs in the area of internet-based streaming media services and internet protocol television (IPTV) services. Examples disclosed herein may also be used in other types of media delivery and e-commerce areas in which people access information of interest that results in creating opportunities for concurrently presenting other media.

Figure 3:
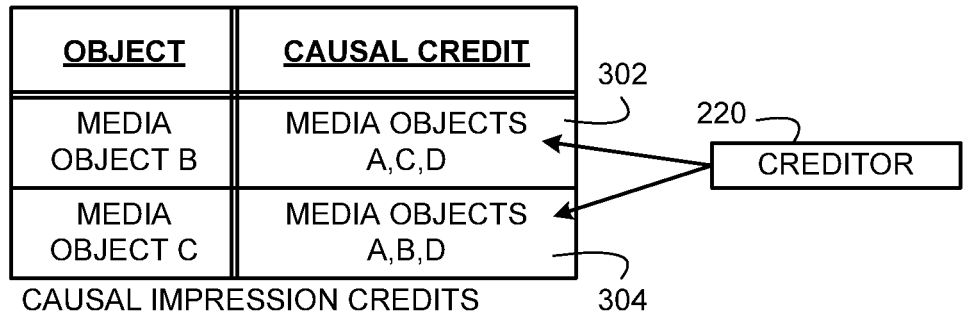
FIG. 3 illustrates an example manner of awarding causal credits to media objects identified as creating opportunities for presenting other media to users.

FIG. 3 illustrates an example manner of awarding causal credits to media objects identified as creating opportunities for presenting other media to users. The example technique shown in FIG. 3 can be used to award causal credits as discussed above. In the illustrated example of FIG. 3, the creditor 220 awards causal credits 302 and 304 to the media object B 104*b* and to the media object C 104*c*. In the illustrated example, the causal credit 302 awarded to the media object B 104*b* references media identifiers that identify the media object A 104*a*, the media object C 104*c*, and the media object D 104*d* which were presented as a result of the opportunity created by the media object B 104*b*. In the illustrated example, the causal credit 304 references media identifiers that identify the media object A 104*a*, the media object B 104*b*, and the media object D 104*d* which were presented as a result of the opportunity created by the media object C 104*c*. Thus, in the illustrated example of FIG. 3, the creditor 220 awards causal credits 302 and 304 to the media objects 104*b* and 104*c* for creating the opportunity to present each other and the media objects 104*a* and 104*d*.

Figure 4:
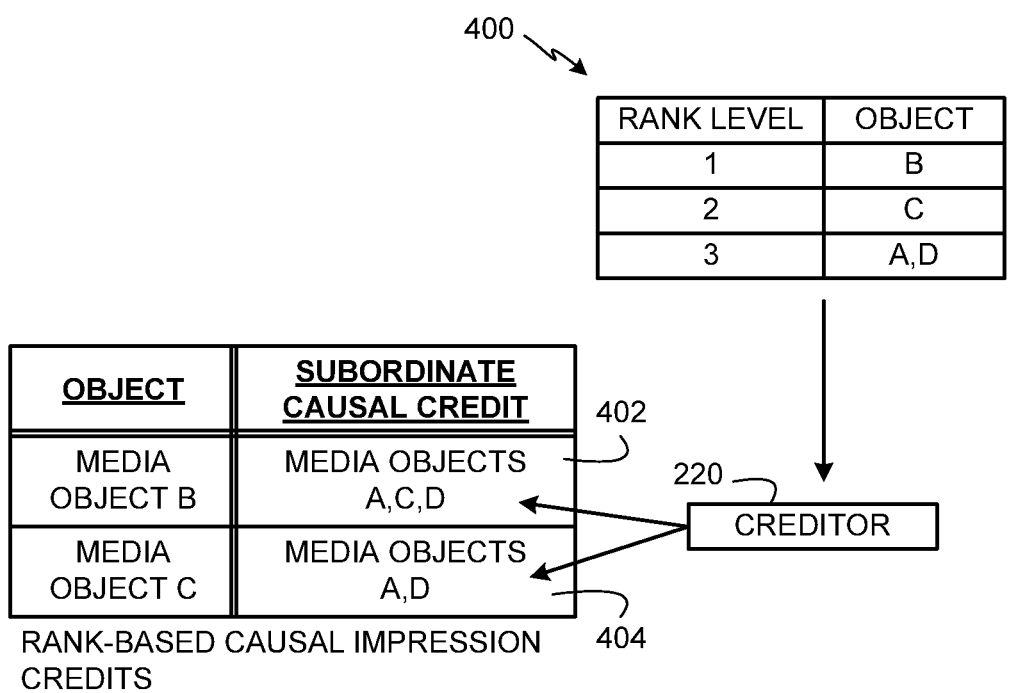
FIG. 4 illustrates an example manner of awarding causal credits to media objects based on a hierarchical ranking system.

In some examples, the creditor 220 is configured to award causal credits based on hierarchical rankings of media objects. That is, the creditor 220 of the illustrated example may award causal credits to higher-ranked media objects for causing opportunities to present lower-ranked media objects. FIG. 4 illustrates an example manner of awarding subordinate causal credits to media objects based on a hierarchical ranking system. The illustrated example of FIG. 4 shows a hierarchical rankings structure 400 in which the media object C 104*c* is ranked higher than the media objects 104*a* and 104*d*, and the media object B 104*b* is ranked higher than the media objects 104*a*, 104*c*, and 104*d*. In such an example, the creditor 220 awards the media object B 104*b* with a causal credit 402 corresponding to the opportunity created to present the media objects 104*a*, 104*c*, and 104*d* which are subordinate in hierarchy relative to the media object B 104*b*. In addition, the creditor 220 awards the media object C 104*c* with a causal credit 404 corresponding to the opportunity created to present the media objects 104*a* and 104*d* which are subordinate in hierarchy relative to the media object C 104*c*. Unlike the causal credit 304 of FIG. 3 which credits the media object C 104*c* for creating an opportunity to present the media object B 104*b* in addition to the media objects 104*a* and 104*d*, the creditor 220 of the illustrated example of FIG. 4 does not award the media object C 104*c* with causal credit corresponding to the opportunity to present the media object B 104*b* because the media object C 104*c* has a lower priority ranking in the example hierarchical rankings structure 400. In addition, the creditor 220 does not award the media objects 104*a* and 104*d* with causal credits corresponding to the opportunity to present the media objects 104*b* and 104*c* because the media objects 104*a* and 104*d* have lower priority rankings in the illustrated hierarchical rankings structure 400. Also, because the media objects 104*a* and 104*d* are ranked at the same level (e.g., rank level 3) in the hierarchical rankings structure 400, the creditor 220 does not award the media objects 104*a* and 104*d* with any causal credit related to the presentation of each other. That is, the creditor 220 of the illustrated example is configured to award subordinate causal credits to media objects for impressions of subordinate media objects but not to award subordinate causal credits to media objects for impressions of higher-ranked or equally-ranked media objects.

In the illustrated example, the media object B 104*b* is a higher-ranked object relative to subordinate media objects A 104*a*, B 104*c*, and D 104*d*. In some examples, the higher-ranked object is also a master object. The creditor 220 of the illustrated example determines which of the media objects 104*a-d* is the higher-ranked object to be credited with the causal credit 302 based on a higher-ranked object identifier. For example, when the creditor 220 identifies a higher-ranked object identifier in the media object B 104*b*, the creditor 220 determines that the the media object B 104*b* is the higher-ranked object to be awarded the causal credit 302 for creating the opportunity to present the subordinate media objects 104*a*, 104*c*, 104*d*.

Media objects can be higher-ranked objects based on different events or criteria. In some examples, media (e.g., a movie, a television program, a sporting event stream or video, a news stream or video, etc.) requested by a user is designated a higher-ranked object, and other juxtaposed, embedded, or sequentially presented media objects (e.g., advertisements or media) are subordinate media objects relative to the higher-ranked object. In some examples, a media object called by another media object is a subordinate object relative to the media object that called it. For example, a main video object (e.g., a movie, a television program, a news video, a sports video, etc.) requested by a user may call an advertisement object. As such, a subordinate object (e.g., a first-level subordinate object) may become a higher-ranked object relative to another subordinate object (e.g., a second-level subordinate object). In some examples, higher-ranked objects or master objects track which objects are caller objects (e.g., higher-ranked objects) and which objects are called objects (e.g., subordinate objects called by a higher-ranked object) so that the creditor 220 can identify higher-ranked objects and subordinate objects to determine which media objects should be awarded causal credits.

Hierarchical priority rankings of media objects may be specified by the AME 202 (FIG. 2), the media publisher(s) 106 (FIG. 1), and/or any other entity that defines how impressions for media objects are analyzed relative to one another. In some examples, the priority rankings may be provided in the media objects as part of the media objects' object characteristics 210*a-d*. In other examples, hierarchical rankings may be provided to the AME 202 as a process separate from beacon requests. For example, the AME 202 may receive a listing of hierarchical rankings for all media objects that participate in beaconing, and the AME 202 may subsequently use the listing of hierarchical rankings each time the AME 202 logs impressions based on received beacon requests. In some examples, the media objects 104*a-d* are provided with hyperlinks that cause the client device 102 to request and retrieve the priority rankings from one or more specified servers (e.g., one or more servers of the media publisher(s) 106, the AME 202, and/or any other entity that specifies, stores and/or serves the priority rankings) when the media objects 104*a-d* are accessed. In this manner, the media publisher(s) 106, the AME 202, and/or any other entity that specifies the priority rankings can change the priority rankings without needing to change or update the media objects 104*a-d*.

Returning to FIG. 2, the panelist profile retriever 222 of the illustrated example is provided to retrieve demographic information corresponding to panelists from the panel database 224 when the identifier 214 of the beacon/impression request 212 corresponds to a panel member of the AME 202. In the illustrated example, the AME 202 stores panelists' demographic information in the panel database 224. To generate and maintain a panel of audience members, the AME 202 enrolls people that consent to being monitored into the panel. During enrollment, the AME 202 receives demographic information from the enrolling people so that subsequent correlations may be made between logged media impressions and panelists corresponding to different demographic segments. In some examples, the panel database 224 also stores purchase behavior, product-affinity information, and/or other consumer behavior and/or interests associated with panel members. The AME 202 may collect such information directly from the panel members and/or may collect the information over time by observing online behaviors of the panel members. In this manner, when the AME 202 logs impressions corresponding to panel members, the AME 202 can correlate such impressions with demographics, purchase behavior, product-affinity information and/or any other consumer behavior and/or interests stored in the panel database 224. To enable the panelist profile retriever 222 to retrieve demographic information for different users identified in beacon requests (e.g., the beacon/impression request 212), the panel database 224 stores reference identifiers of panel members in association with corresponding demographic information of those panel members.

The demographics collector 228 of the illustrated example of FIG. 2 is provided to obtain demographic information from one or more of the database proprietors 204. Different techniques for obtaining such demographic information from the database proprietors 204 are described below in connection with FIGS. 5-7. In examples disclosed herein, the database proprietors 204 are entities that operate based on user registration models. As used herein, a user registration model is a model in which users subscribe to services of those entities by creating an account and providing demographic-related information about themselves. In some examples, the demographic information stored at and provided by the database proprietors 204 may include purchase behavior, product-affinity information, and/or other consumer behavior and/or interests associated with registered users of the database proprietors 204. The database proprietors 204 may collect such information directly from the registered users and/or may collect the information over time by observing online behaviors of the registered users.

Sharing of demographic information associated with registered users of the database proprietors 204 enables the AME 202 to extend or supplement its panel data in the panel database 224 with substantially reliable demographic information from external sources (e.g., the database proprietors 204), thus extending the coverage, accuracy, and/or completeness of demographics-based audience measurements collected by the AME 202. Such access to the database proprietors 204 also enables the AME 202 to monitor persons who would not otherwise have joined a panel of the AME 202. Any entity having a database identifying demographics of a set of individuals may cooperate with the AME 202. Such entities, referred to herein as "database proprietors," may include entities such as Facebook, Google, Yahoo!, MSN, Twitter, Apple iTunes, Experian, etc.

The demographics corrector 226 of the illustrated example is provided to analyze demographic information received from the database proprietors 204 relative to panelist demographic information stored in the panel database 224 for corresponding media impressions to correct or adjust the demographic information from the database proprietors 204. In examples disclosed herein, panelist demographic information stored in the panel database 224 is reliable, high-quality data that is trusted for its accuracy which results from the methodologies used by the AME 202 to recruit panelists and collect their demographic information. For example, the AME 202 may conduct personal or telephonic interviews of panelists to confirm the accuracy of collected demographic data. In addition, the AME 202 may employ agents to review the demographic information in the panel database 224 for possible inaccuracies or missing information and to follow up with panel members to correct the demographic information. In addition, the AME 202 may incentivize panel members to provide demographic information by giving the panel members monetary rewards or other forms of compensation in exchange for truthful, complete, and accurate demographic information. As such, the demographics corrector 226 may correct demographic information received from database proprietors 204 based on accurate panelist demographic information. For example, for media impressions logged for a particular media object (e.g., one of the media objects 104*a-d*), the demographics corrector 226 receives panelist demographic information from the panel database 224 of panelists known to have been exposed to the particular media object. The demographics corrector 226 also receives demographic information from the database proprietors 204. In some examples, the database proprietors 204 provide aggregate demographic information. Aggregate demographic information includes demographic information of numerous users that is combined to show different demographic segments for groups of people exposed to a particular media object (e.g., percentages of users that are female or male, percentages of users across different age range buckets, etc.). The demographic information collected by database proprietors 204 can sometimes be less accurate than panelist demographics due to lack of truthfulness, forgetfulness, misunderstandings, etc. during registration processes when people register for services of the database proprietors 204. As such, the example demographics corrector 226 is provided to apply adjustments or corrections to demographics information received from the database proprietors 204 based on panelist demographic information stored in the panel database 224. For example, if the panelist demographic information from the panel database 224 shows that a high percentage of panel members exposed to particular media correspond to an age range bucket of 35-40 years of age, and the demographic information from the database proprietors 204 shows significant outliers in age range buckets of 18-21 years of age and 75+ years of age, the demographics corrector 226 can adjust the outlier demographics information to better align with the more prominent age range bucket observed from the panel database 224.

In the illustrated example, the attributor 230 is provided to attribute demographic information to media objects (e.g., the media objects 104*a-d*). Some examples disclosed herein enable attributing the same demographics of a user to multiple media objects concurrently presented on a client device. For example, in the illustrated example of FIG. 2, the client device 102 concurrently presents the media objects 104*a-d*, and the beacon instructions 208 in the media object A 104*a* cause the client device 102 to send the object characteristics 210a-d and the identifier 214 in the beacon/impression request 212 to the AME 202. Based on the information in the beacon request 214, the attributor 230 can determine that a same user corresponding to the identifier 214 was exposed to all of the media objects 104a-d. As such, the attributor 230 of the illustrated example receives demographic information corresponding to the user (e.g., corresponding to the identifier 214) from the demographics corrector 226 and imputes (or associates) the demographic information to the logged impressions for all of the media objects 104a-d represented by the object characteristics 210a-d in the beacon/impression request 212. In this manner, the attributor 230 can associate the same demographic information with multiple impressions logged from a single beacon/impression request 212, which advantageously reduces the number of communications (e.g., beacon requests) needed from the client device 102 to log impressions and corresponding demographic information for numerous media objects presented on the client device 102.

In the illustrated example, the report generator 232 is provided to generate demographic-based impression reports showing statistics of different demographic segments of logged impressions for different media objects (e.g., the media objects 104a-d). In the illustrated example, the AME 202 may sell and/or provide such demographic-based impression reports to advertisers, product manufacturers, service providers, media producers, media distributors, media networks, and/or any other entity interested in creating, producing, and/or distributing media, and/or any other entity interested in buying and/or selling advertisement space. Such demographic-based impression reports can assist entities in deciding where to spend money on creating, producing, and/or distributing media and/or where to spend advertising money to reach particular demographic segments.

While an example manner of implementing the example apparatus 216 is illustrated in FIG. 2, one or more of the elements, processes and/or devices illustrated in FIG. 2 may be combined, divided, re-arranged, omitted, eliminated and/or implemented in any other way. Further, the example impressions monitor 218, the example creditor 220, the example panelist profile retriever 222, the example panel database 224, the example demographics corrector 226, the example demographics collector 228, the example attributor 230, and the example report generator 232 and/or, more generally, the example apparatus 216 of FIG. 2 may be implemented by hardware, software, firmware and/or any combination of hardware, software and/or firmware. Thus, for example, any of the example impressions monitor 218, the example creditor 220, the example panelist profile retriever 222, the example panel database 224, the example demographics corrector 226, the example demographics collector 228, the example attributor 230, and the example report generator 232 and/or, more generally, the example apparatus 216 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example impressions monitor 218, the example creditor 220, the example panelist profile retriever 222, the example panel database 224, the example demographics corrector 226, the example demographics collector 228, the example attributor 230, and/or the example report generator 232 is/are hereby expressly defined to include a tangible computer readable storage device or storage disk such as a memory, a digital versatile disk (DVD), a compact disk (CD), a Blu-ray disk, etc. storing the software and/or firmware. Further still, the example apparatus 216 of FIG. 2 may include one or more elements, processes and/or devices in addition to, or instead of, those illustrated in FIG. 2, and/or may include more than one of any or all of the illustrated elements, processes and devices.

Figure 5:
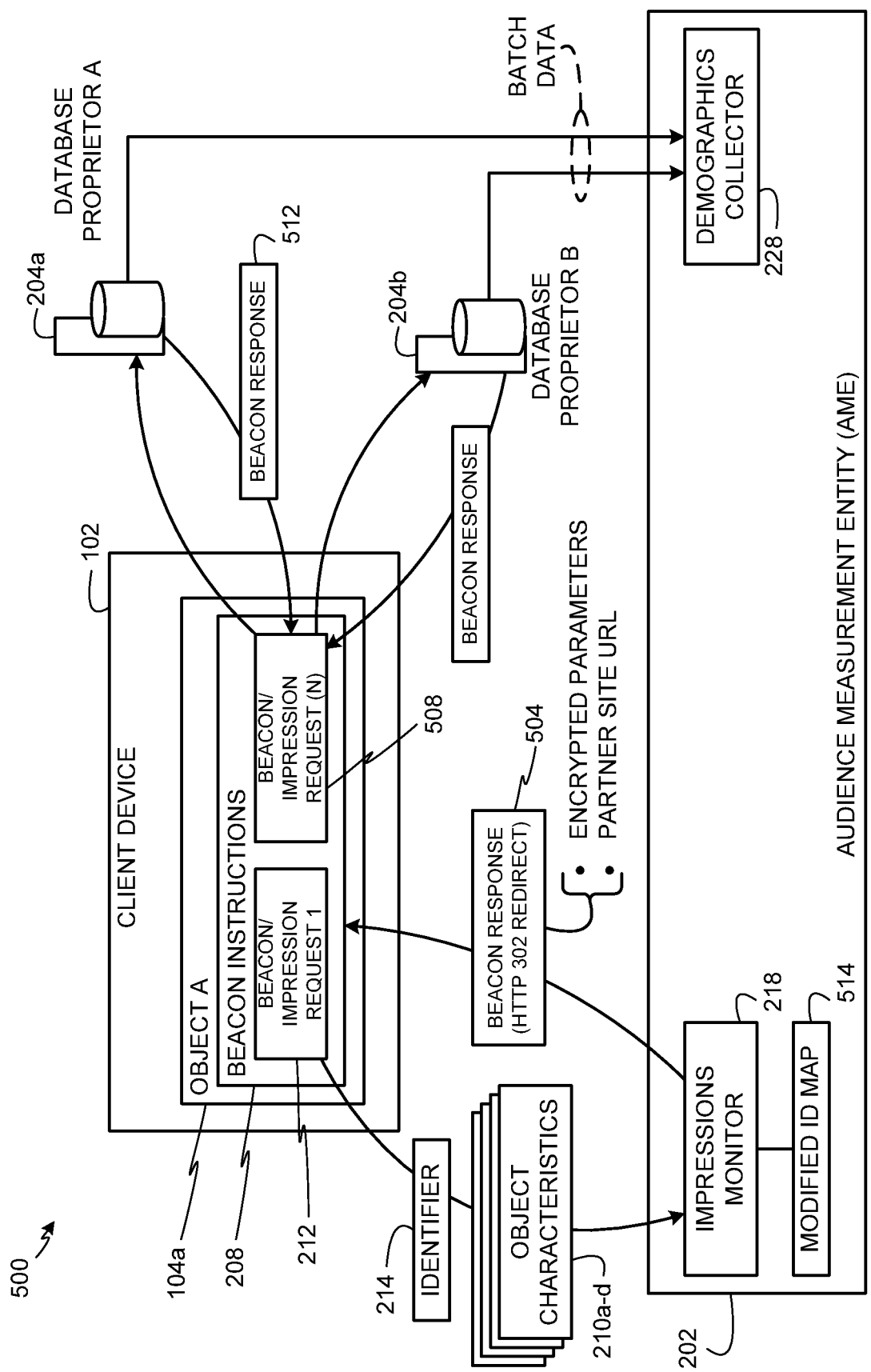
FIG. 5 is a communication flow diagram of an example manner in which an audience measurement entity (AME) can collect impressions and demographic information based on a client device reporting impressions to the AME and to distributed database proprietors.

FIG. 5 is a communication flow diagram 500 of an example manner in which the AME 202 of FIG. 2 can collect impressions and demographic information based on a client device reporting impressions to the AME 202 and to the distributed database proprietors 204 of FIG. 2. The example communication flow diagram 500 shows an example manner in which the example apparatus 216 of FIG. 2 logs impressions reported by a client device (e.g., client device 102). The example chain of events shown in FIG. 5 occurs when a client device 102 accesses tagged media (e.g., one or more of the tagged media objects 104a-d of FIGS. 1 and 2). Thus, the events of FIG. 5 begin when a client sends an HTTP request to a server (e.g., one or more of the media providers 106 of FIG. 1) for media, which, in this example, is tagged to forward an impression request (e.g., the beacon/impression request 212) to the AME 202. In the illustrated example of FIG. 5, the client device 102 receives the requested media object A 104a from a media provider (e.g., one of the media providers 106 of FIG. 1). In some examples, the client device 102 requests a webpage containing media of interest (e.g., www.weather.com) and the requested webpage contains the media of interest and links to ads that are downloaded and rendered within the webpage. The ads may come from different servers than the originally requested media of interest.

In the illustrated example, the media object A 104a is tagged with the beacon instructions 208 (and with the collector instructions 206 of FIG. 2 which are not shown in FIG. 5). The beacon instructions 208 cause the client device 102 to send the beacon/impression request 212 to the impression monitor 218 when the client device 102 accesses the media object A 104a. In the illustrated example, the client device 102 sends the beacon/impression request 212 using an HTTP request addressed to the URL of the impression monitor 218 at, for example, a first internet domain. The beacon/impression request 212 of the illustrated example includes the media object characteristics 210a-d for all of the media objects 104a-d of FIGS. 1 and 2. In the illustrated example, the collector instructions 206 cause the client device 102 to collect the media object characteristics 210a-d from the media objects 104a-d. The collector instructions 206 may be provided in the media object A 104a when the media object A 104a is served to the client device 102 or the client device 102 may send a beacon request prior to the beacon/impression request 212 to request the collector instructions 206 from a server. In any case, by reporting the media object characteristics 210a-d, examples disclosed herein can be used to report multiple impressions for multiple media objects (e.g., the media objects 104a-d) presented at a client device using a single beacon request (e.g., the beacon/impression request 212) that includes information (e.g., the media object characteristics 210a-d) about all of the presented media objects. Such an example manner of reporting multiple impressions in a single beacon request reduces the amount of required bandwidth and processing resources of a client device, a receiving server (e.g., the impression monitor 218), and a network. In addition, the beacon/impression request 212 of the illustrated example includes the identifier 214 as shown in FIG. 2. In other examples, the identifier 214 may not be passed until the client device 102 receives a request sent by a server of the AME 202 in response to, for example, the impression monitor 218 receiving the beacon/impression request 212.

In response to receiving the beacon/impression request 212, the impression monitor 218 logs impressions for all of the media objects 104a-d by recording the media object characteristics 210a-d contained in the beacon/impression request 212. In some examples, the impression monitor 218 logs the impressions by recording media identification information that is determined based on the media object characteristics 210a-d. For example, if the media object characteristics 210a-d include codes and/or signatures that the collector instructions 206 (FIG. 2) collected from the media objects 104a-d, the impressions monitor 218 can look up identification information corresponding to the media objects 104a-d based on the codes and/or signatures using any suitable technique known in the art.

In some examples, the impressions monitor 218 logs impressions regardless of whether the client device 102 sends an identifier 214 to the impression monitor 218. However, if the client device 102 sends an identifier 214, and the identifier 214 matches a user ID of a panelist member (e.g., a panelist corresponding to a profile stored in the panel database 224 of FIG. 2), the logged impressions for the media objects 104a-d will correspond to a panelist of the AME 202. If the identifier 214 does not correspond to a panelist of the AME 202, the impression monitor 218 will still benefit from logging the impressions for the media objects 104a-d even though it will not have a user ID record (and, thus, corresponding demographics) for the impressions logged based on the beacon/impression request 212.

In the illustrated example of FIG. 5, to compare or supplement panelist demographics (e.g., for accuracy or completeness) of the AME 202 with demographics from one or more of the database proprietors 204 (FIG. 2), the impression monitor 218 returns a beacon response message 504 (e.g., a first beacon response) to the client device 102 including an HTTP "302 Found" re-direct message and a URL of a participating database proprietor 204 at, for example, a second internet domain. In the illustrated example, the HTTP "302 Found" re-direct message in the beacon response 504 instructs the client device 102 to send a second beacon request 508 to a database proprietor A 204a. In other examples, instead of using an HTTP "302 Found" re-direct message, redirects may instead be implemented using, for example, an iframe source instruction (e.g., <iframe src=" ">) or any other instruction that can instruct a client device to send a subsequent beacon request (e.g., the second beacon request 508) to a participating database proprietor 204. In the illustrated example, the impression monitor 218 determines the database proprietor 204a specified in the beacon response 504 using a rule and/or any other suitable type of selection criteria or process. In some examples, the impression monitor 218 determines a particular database proprietor to which to redirect a beacon request based on, for example, empirical data indicative of which database proprietor is most likely to have demographic data for a user corresponding to the identifier 214. In some examples, the beacon instructions 208 include a predefined URL of one or more database proprietors 204 to which the client device 102 should send follow up beacon requests 508. In other examples, the same database proprietor is always identified in the first redirect message (e.g., the beacon response 504) and that database proprietor always redirects the client device 102 via a beacon response 512 to a same second database proprietor 204b when the first database proprietor 204a cannot identify the identifier 214 (FIG. 2) as corresponding to one of its registered users (and, thus, does not have demographic information corresponding to the identifier 214) and/or does not log impressions for the media objects 104a-d.

In some examples, prior to sending the beacon response 504 to the client device 102, the impression monitor 218 replaces site IDs (e.g., URLs) of the media provider(s) 106 (FIG. 1) that served the media objects 104a-d with modified site IDs (e.g., substitute site IDs) which are discernible only by the impression monitor 218 as corresponding to the media provider(s) 106. In some examples, the impression monitor 218 may also replace the host website ID (e.g., www.acme.com) with a modified host site ID (e.g., a substitute host site ID) which is discernible only by the impression monitor system 218 as corresponding to the host website. In this way, the source(s) of the media objects 104a-d and/or the host website are obscured from participating database proprietors 104a-d. In some examples, the impression monitor 218 also replaces the media object characteristics 210a-d with modified media characteristics or modified media identifiers corresponding to the media object characteristics 210a-d. In some examples, the impression monitor 218 does not send site IDs, host site IDS, the media object characteristics 210a-d or modified versions in the beacon response 504.

In the illustrated example, the impression monitor 218 maintains a modified ID mapping table 514 that maps original site IDs with modified (or substitute) site IDs and/or maps modified media characteristics or identifiers to the media object characteristics 210-d to obfuscate or hide such information from database proprietors. Also in the illustrated example, the impression monitor 218 encrypts all of the information received in the beacon/impression request 212 and the modified information to prevent any intercepting parties from decoding the information. The impression monitor 218 of the illustrated example sends the encrypted information in the beacon response 504 to the client device 102. In the illustrated example, the impression monitor 218 uses an encryption that can be decrypted by the selected partner site specified in the HTTP "302 Found" re-direct message.

Periodically or aperiodically, the impression data collected by the database proprietors 204 is provided to the demographics collector 228 of the AME 202 as batch data. As discussed above, some user IDs (e.g., the identifier 214 of FIG. 2) may not match panel members of the AME 202, but may match registered users of one or more database proprietors 204. During a data collecting and merging process to combine demographic and impression data from the AME 202 and the participating database proprietors 204, user IDs of some impressions logged by one or more database proprietors 204 may match user IDs of impressions logged by the impression monitor 218, while others will not match. In some examples, the AME 202 may use the demographics-based impressions from matching user ID logs provided by database proprietors 204 to assess and/or improve the accuracy of its own demographic data stored in the panel database 224 of FIG. 2, if necessary. For the demographics-based impressions associated with non-matching user ID logs, the AME 202 may use the impressions (e.g., advertisement impressions, content impressions, and/or any other media impressions) to derive demographics-based online ratings even though such impressions are not associated with panelists of the AME 202.

Additional examples that may be used to implement the beacon instruction processes of FIG. 5 are disclosed in Mainak et al., U.S. Pat. No. 8,370,489, which is hereby incorporated herein by reference in its entirety. In addition, other examples that may be used to implement such beacon instructions are disclosed in Blumenau, U.S. Pat. No. 6,108,637, which is hereby incorporated herein by reference in its entirety.

Figure 6:
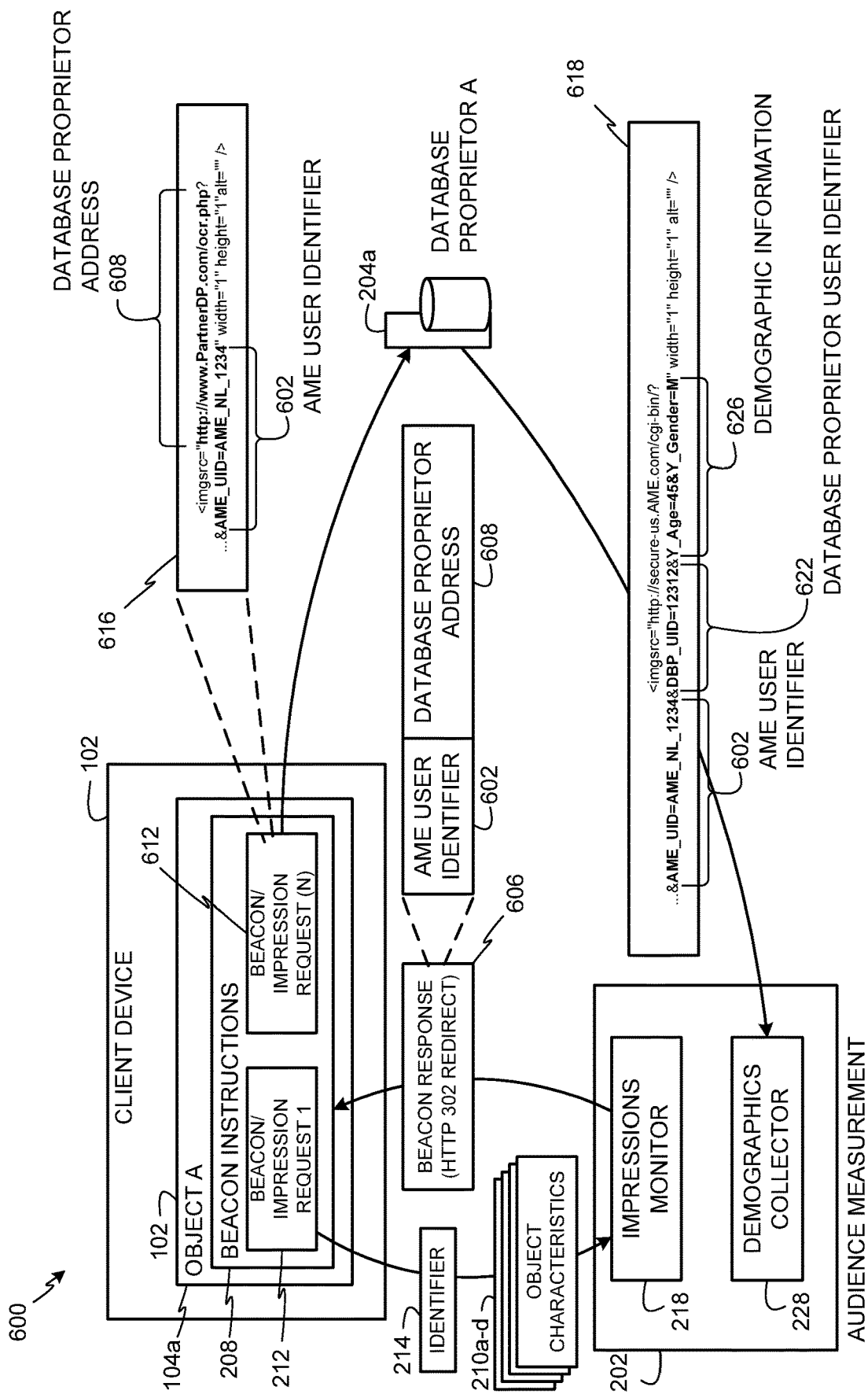
FIG. 6 depicts a communication flow diagram of an example manner in which an AME can receive demographic information from database proprietors on a per-beacon reporting basis.

FIG. 6 depicts a communication flow diagram 600 of an example manner in which the AME 202 can receive demographic information from database proprietors 204 on a per-beacon reporting basis. The communication flow diagram 600 of the illustrated example involves generating an AME-to-database proprietor user ID mapping based on a re-direct from the AME 202 to a partner database proprietor 204. In the illustrated example of FIG. 6, the media object A 104a is tagged with the beacon instructions 208 (and the collector instructions 206 of FIG. 2 which are not shown in FIG. 6).

In the illustrated example of FIG. 6, when the impressions monitor 218 receives the beacon/impression request 212 from the client device 102, the impression monitor 218 determines whether the beacon/impression request 212 includes an AME user identifier (e.g., the identifier 214 of FIG. 2) that can be used by the AME 202 to identify the client device 102. In some examples, the AME user identifier is an AME cookie that is set by the AME 202 in the AME internet domain. If the beacon/impression request 212 does not include an AME user identifier, the impression monitor 218 creates an AME user identifier for the client device 102. If the beacon/impression request 212 does include an AME user identifier, the impression monitor 218 determines whether the AME user identifier is associated with (e.g., mapped to) a database proprietor user identifier for a database proprietor 204. If there is a database proprietor user identifier, the example impression monitor 218 stores an impression in association with the AME user identifier corresponding to the client device 102. The impression monitor 218 may or may not respond to the beacon/impression request 212. In the illustrated example, the impression monitor 218 responds to the beacon/impression request 212 with something not intended to affect display of the media objects 104a-d (e.g., with a transparent 1×1 pixel image or other requested media such as a placeholder). In some examples, the beacon/impression request 212 does not elicit a response.

In the illustrated example of FIG. 6, the example impression monitor 218 sends a re-direct message (e.g., an HTTP "302 Found" re-direct message) to the client device 102 in a beacon response 606 in response to the beacon/impression request 212. If the impression monitor 218 of the illustrated example created an AME user identifier (e.g., the identifier 214 of FIG. 2) for the client device 102, or if there is no database proprietor user identifier for the client device 102 associated with (e.g., mapped to) an existing AME user identifier, the example impression monitor 218 adds an AME user identifier 602 to a URL parameter of the beacon response 606. The example impression monitor 218 also adds to the URL parameter of the beacon response 606 an internet address 608 of a database proprietor 204a or multiple addresses of multiple database proprietors 204. For example, the impression monitor 218 may select one or more of multiple database proprietors (e.g., from a list of cooperating partner database proprietors) based on, for example, the expected demographics of users to which media is served by the media provider(s) 106. In some examples, the impression monitor 218 selects a default database proprietor 204 and one or more backup database proprietors 204. For example, the default and backup database proprietors 204 may be used by the client device 102 to send re-directed beacon requests 612 to multiple database proprietors 204 in seriatum until one of the database proprietors 204 confirms that it recognizes the client device 102 as corresponding to one of its registered users.

The example client device 102 receives the beacon response 606 and sends a beacon request 612 to the database proprietor 204a based on (e.g., using) the internet address 608. In the illustrated example, the client device 102 sends the beacon request 612 to the internet address 608 of the database proprietor A 204a, and includes the AME user identifier 602 (e.g., an AME_UID_value) in a parameter of a URL 616 that includes the internet address 608. In the illustrated example, the client device 102 may have a database proprietor user identifier (not shown) created and managed by the database proprietor 204a to identify the client device 102 and/or a registered user associated with the client device 102. If the client device 102 has a database proprietor user identifier for the domain of the database proprietor 204a, the example client device 102 also provides the database proprietor user identifier with the beacon request 612. In some examples, the beacon instructions 208 may cause the client device 102 to also locate other information in the beacon request 612 such as media ID, media type ID, ad campaign ID, placement ID, and/or any other information related to the media object A 104a.

When the database proprietor A 204a of the illustrated example receives the beacon request 612, the database proprietor A 204a determines whether an AME user ID 602 is provided by the client device 102 in the beacon request 612. If the beacon request 612 includes the AME user ID 602, the example database proprietor 204a maps the AME user ID 602 to a database proprietor user ID 622 (e.g., a DBP_UID). In the illustrated example, the database proprietor A 204a locates the mapped AME user ID 602 and database proprietor user ID 622 (e.g., stores an association between the AME user identifier 602 and the database proprietor user ID 622) as a parameter in a URL 618 that includes the internet address of the AME 202. The database proprietor A 204a sends a message using the URL 618 to the example demographics collector 228 that indicates the mapping between the AME user identifier 602 and the database proprietor user identifier 622. Thus, in the illustrated example, the message transmitted using the URL 618 provides, as a parameter of the URL 618, the mapping between the AME user identifier 602 and the database proprietor user identifier 622 for the impression(s) logged by the impressions monitor 218 based on the beacon/impression request 212.

In the illustrated example of FIG. 6, the URL 618 also includes, as parameters of the URL 618, demographic information 626 associated with the client device 102 (e.g., demographic information for a user of the client device 102) that is known to the database proprietor A 204a. The demographic information 626 includes age (Y_Age=45) and gender (Y_Gender=M). However, any other type of demographic information may alternatively or additionally be provided in the URL 618. In some examples, the URL 618 further includes a timestamp of the user identifier mapping. In some other examples, the impressions monitor 218 and/or the demographics collector 228 stores the timestamps derived from HTTP messages transmitted and received during the mapping process. In some examples, the AME user identifier 602 is unique such that the timestamps are not necessary for matching the AME user identifier 602 and/or the database proprietor user identifier 622 to impressions data.

In the illustrated example, the demographics collector 228 stores the mapping between the AME user identifier 602 and the database proprietor identifier 622, and stores the demographic information 626 in connection with the mapped identifiers. For subsequent beacon requests received from the client device 102 for the same AME user identifier 602, the example impressions monitor 218 logs a corresponding impression and does not need to re-direct the user device 102 thereby reducing traffic to the database proprietor 204a.

Additional examples that may be used to collect demographic impressions based on providing demographic information and/or mapping AME-to-database proprietor user identifiers in URL parameters are disclosed in Seth et al., U.S. application Ser. No. 13/915,381, filed on Jun. 11, 2013, which is hereby incorporated herein by reference in its entirety.

In the illustrated example, based on receiving the demographic information 626 in the URL 618 in connection with the AME user identifier 602, the AME 202 can associate the demographic information 626 with the media impressions for all of the media objects 104a-d (FIGS. 1 and 2) that the impressions monitor 218 logged based on the beacon/impression request 212. Thus, by using the collector instructions 206 and the beacon instructions 208 in the media object A 104a shown in FIG. 2 to cause the client device 102 to report impressions for all of the media objects 104a-d in a single beacon/impression request 212, the AME 202 can log numerous impressions with corresponding demographic information received from the database proprietor 204a based on a single beacon request (e.g., the beacon/impression request 212) that reports the numerous impressions. In this manner, bandwidth and processing resources needed from the client device 102, networks, and servers are not significantly increased while increasing the number of impressions that are collected.

Figure 7:
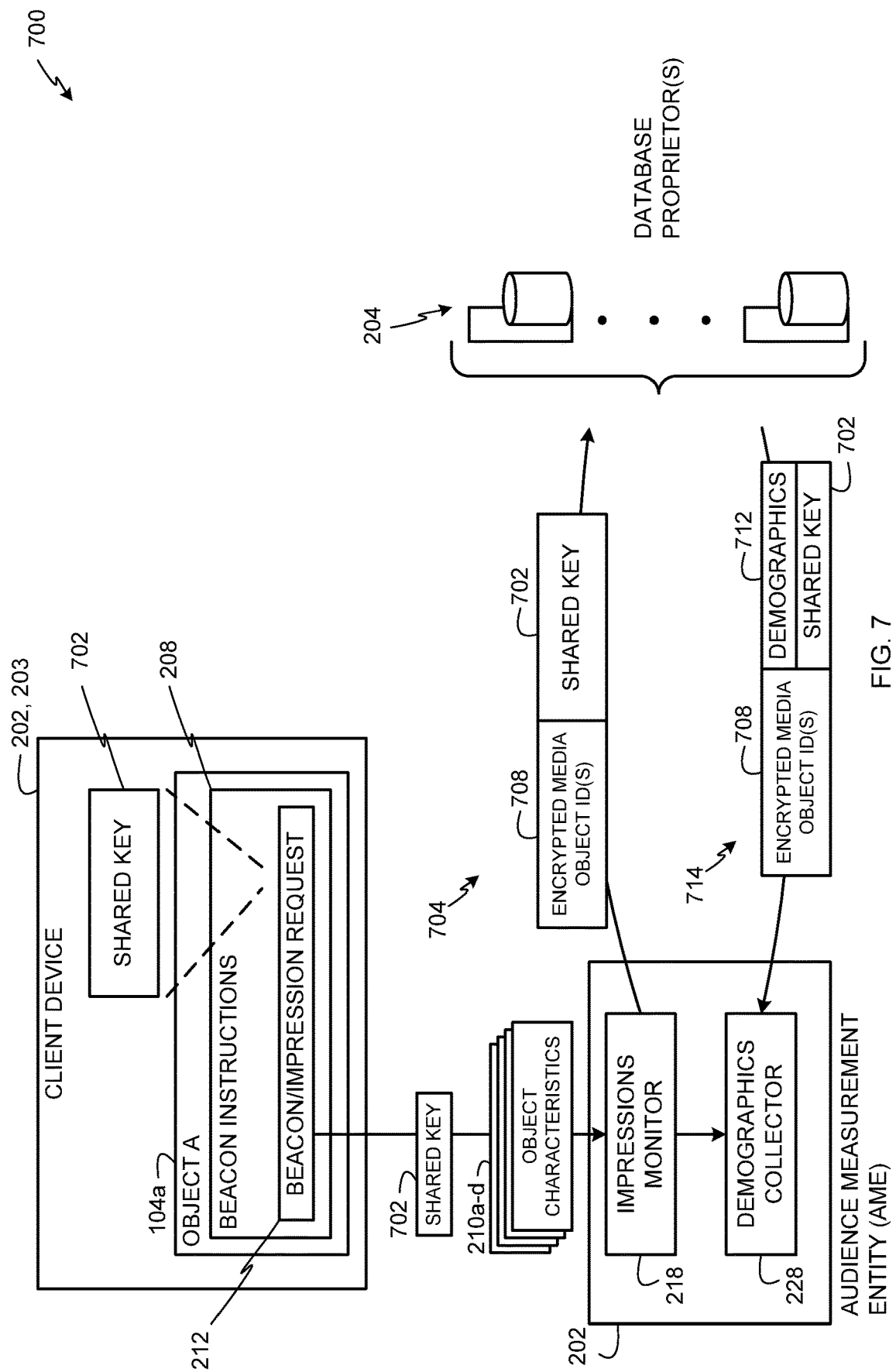
FIG. 7 depicts a communication flow diagram of an example manner in which an AME can receive demographic information from database proprietors based on keys or other identification information held by both the AME and the database proprietors.

FIG. 7 depicts a communication flow diagram 700 of an example manner in which the AME 202 can receive demographic information from the database proprietors 204 based on shared keys or other identification information shared between the AME 202 and the database proprietors 204. In the illustrated example of FIG. 7, the beacon instructions 208 of the media object A 104a cause the client device 102 to send a shared key 702 in the beacon/impression request 212. The shared key 702 of the illustrated example may implement the identifier 214 of FIG. 2. In addition, the beacon/impression request 212 also includes the media object characteristics 210a-d for all of the media objects 104a-d of FIGS. 1 and 2. In this manner, the single beacon/impression request 212 can be used to report multiple impressions for multiple media objects.

When the impression monitor 218 receives the beacon/impression request 212, the impression monitor 218 logs multiple impressions corresponding to the numerous media objects 104a-d. In addition, the impression monitor 218 sends a demographic information request 704 to one or more of the database proprietors 204. In the illustrated example, the demographic information request 704 includes the shared key 702. The shared key 702 of the illustrated example is an identifier that uniquely identifies the client device 102 to the AME 202 and one or more of the database proprietors 204. For example, the one or more database proprietors 204 that recognize the shared key 702 as uniquely identifying the client device 102 can store the shared key 702 in association with user registration accounts corresponding to the user or users of the client device 102. Similarly, the AME 202 can also store the shared key 702 in the panel database 224 of FIG. 2 in association with one or more panel member records of user(s) corresponding to the client device 102. In this manner, when the impression monitor 218 and the one or more database proprietors 204 receive the shared key 702, the AME 202 and the database proprietor(s) 204 can retrieve demographic information corresponding to the client device 102 based on the shared key.

In the illustrated example, the impression monitor 218 includes encrypted media object ID(s) 708 in the demographic information request 704. The encrypted media object ID(s) 708 of the illustrated example are media identifiers that correspond to the media objects 204a-d of FIGS. 1 and 2. For example, the impression monitor 218 can generate the encrypted media object ID(s) 708 based on media object IDs retrieved from the media object characteristics 210a-d in the beacon/impression request 212 and/or based on media object IDs determined by the impression monitor 218 (e.g., via a look up table or media reference database) based on media characteristics obtained from the media object characteristics 210a-d. In any case, to obscure the identities of the media objects 104a-d from intercepting parties and/or from the database proprietors 204, the impression monitor 218 of the illustrated example, encrypts the media object ID(s) corresponding to the media objects 104a-d to generate the encrypted media object ID(s) 708. In some examples, the database proprietors 204 are provided with information (e.g., encryption keys) to decrypt the encrypted media object ID(s) 708. In other examples, the database proprietors 204 do not decrypt the encrypted media object ID(s) 708. In yet other examples, the impressions monitor 218 does not encrypt media object ID(s) and instead sends media object ID(s) in the demographic information request 704 without obscuring the media object ID(s).

In the illustrated example, the database proprietor(s) 204 retrieve demographic information 712 corresponding to the shared key 702 and associate the demographic information 712 with the encrypted media object ID(s) 708 (or unencrypted media object ID(s)). The database proprietor(s) 204 then send a demographic information response 714 to the demographics collector 228 at the AME 202 including the associated demographic information 712 and the encrypted media object ID(s) 708. In this manner, the AME 202 can associate the demographic information 712 with impressions logged by the impressions monitor 218 for corresponding ones of the media objects 104a-d based on the demographic information 712 associated with corresponding ones of the encrypted media object ID(s) 708. In the illustrated example, the database proprietor(s) 204 include the shared key 702 in the demographic information response 714 in association with the demographic information 712 and the encrypted media object ID(s) 708. In other examples, the shared key 702 is omitted from the demographic information response 714. For example, the database proprietor(s) 204 may want to return anonymous demographics so that the AME 202 can associate demographic information to media impressions, but cannot determine which demographics correspond to which client devices. In this manner, the database proprietor(s) 204 can obscure connections between client devices and particular demographics while still providing the AME 202 the ability to accurately associate demographic information with corresponding media impressions based on the demographic information 712 being associated with corresponding encrypted media object ID(s) 708.

Using the example processes illustrated in FIGS. 5-7, impressions (e.g., advertisement impressions, content impressions, and/or any other types of media impressions) can be mapped to corresponding demographics when multiple impressions for numerous media objects (e.g., the media object 104a-d of FIGS. 1 and 2) are reported in a single beacon request (e.g., the beacon/impression request 212 of FIGS. 2 and 5-7). In addition, the example process of FIGS. 5-7 enable mapping impressions to demographics even when beacon requests are received from client devices that are not associated with panel members of the AME 202. That is, during an impression collection or merging process, the AME 202 can collect distributed impressions logged by (1) the impression monitor 218 and (2) any participating database proprietor 204. As a result, the collected data covers a larger population with richer demographic information than has previously been possible. In addition, by receiving multiple impressions in a single beacon request, demographic information can be associated with significantly more media impressions without significantly increasing the bandwidth requirements or processing resource requirements of client devices, networks, and/or servers. Consequently, generating accurate, consistent, and meaningful online ratings is possible by pooling the resources of the distributed databases as described above. The example processes of FIGS. 5-7 generate online ratings based on a large number of combined demographic databases distributed among unrelated parties (e.g., Nielsen, Facebook, Google, Yahoo!, etc.). The end result appears as if users attributable to the logged impressions were part of a large virtual panel formed of registered users of the audience measurement entity because the selection of the participating partner sites can be tracked as if they were members of a panel maintained by the AME 202. This is accomplished without violating the privacy protocols and policies of the Internet.

Although the examples of FIG. 5-7 show direct communications between the AME 202 and the database proprietors 204, in other examples, an intermediary server (e.g., a third party) may be used to broker communications and process data exchanged between the AME 202 and the database proprietors 204. For example, intermediary third-party servers may merge and/or adjust demographic information provided by the AME 202 and the database proprietors 204. The intermediary third-party servers can then provide the merged and/or adjusted demographic information to the AME 202 and to the database proprietors 204 in such a manner that the AME 202 and the database proprietors 204 can attribute the demographic information to corresponding logged impressions.

Figure 8:
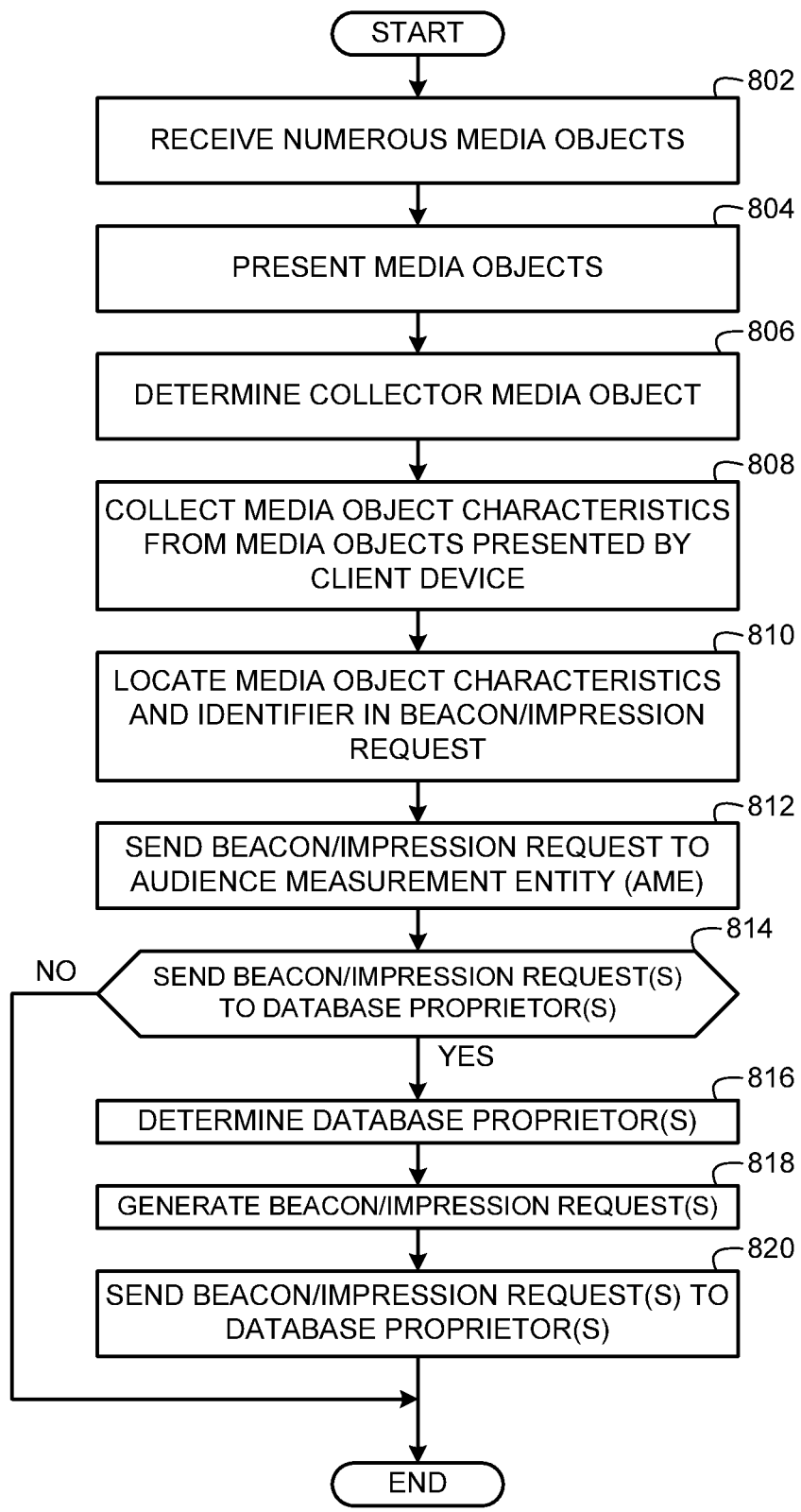
FIG. 8 is a flow diagram representative of example machine readable instructions that may be executed by a client device of FIGS. 1 and 2 to report media object impressions to an AME and/or one or more database proprietors.
Figure 9:
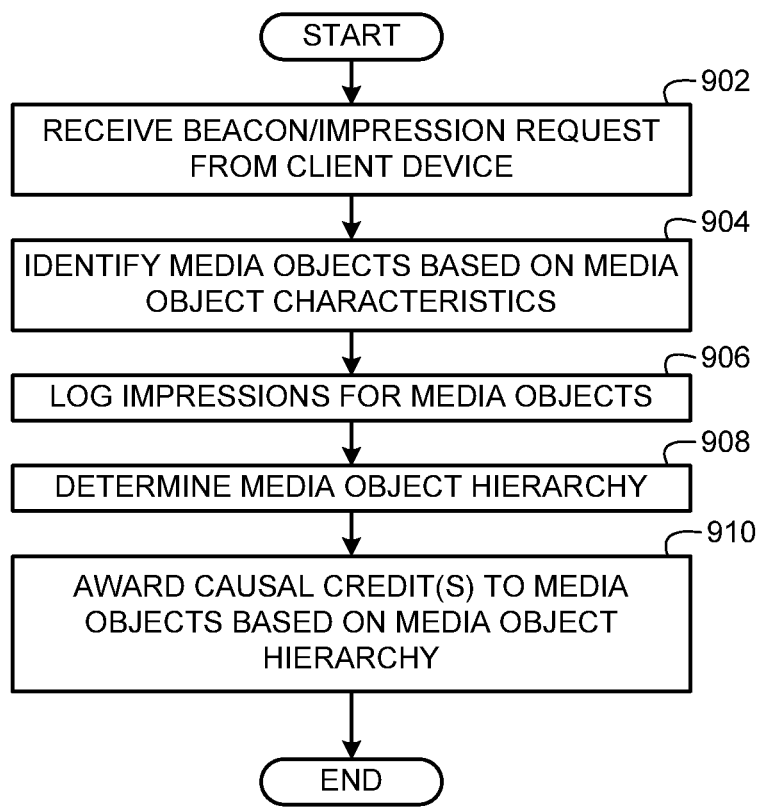
FIG. 9 is a flow diagram representative of example machine readable instructions that may be executed by an apparatus of FIG. 2 at an AME to log impressions for media objects.
Figure 10:
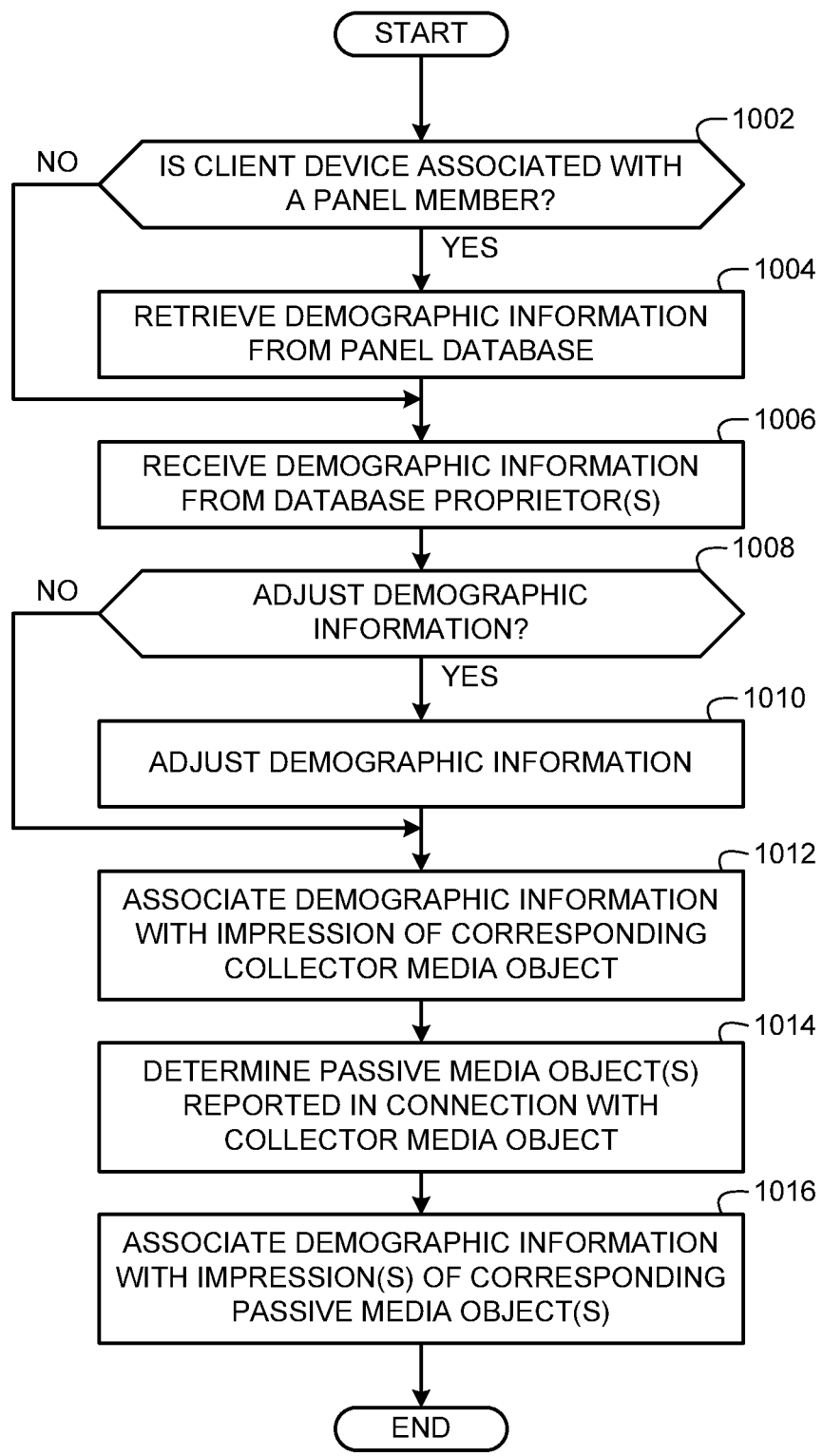
FIG. 10 is a flow diagram representative of example machine readable instructions that may be executed by an apparatus of FIG. 2 at an AME to associate demographic information with impressions for media objects concurrently presented at a client device.

Flowcharts representative of example machine readable instructions for implementing the client device 102 of FIGS. 1, 2, and 5-7 and/or the example apparatus 216 of FIG. 2 are shown in FIGS. 8-10. In this example, the machine readable instructions comprise programs for execution by a processor such as the processor 1112 shown in the example processor platform 1100 discussed below in connection with FIG. 11. The programs may be embodied in software stored on a tangible computer readable storage medium such as a CD-ROM, a floppy disk, a hard drive, a digital versatile disk (DVD), a Blu-ray disk, or a memory associated with the processor 1112, but the entirety of the programs and/or parts thereof could alternatively be executed by a device other than the processor 1112 and/or embodied in firmware or dedicated hardware. Further, although the example programs are described with reference to the flowcharts illustrated in FIGS. 8-10, many other methods of implementing the example client device 102 and/or the example apparatus 216 may alternatively be used. For example, the order of execution of the blocks may be changed, and/or some of the blocks described may be changed, eliminated, or combined.

As mentioned above, the example processes of FIGS. 8-10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 8-10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disc and to exclude propagating signals. As used herein, when the phrase "at least" is used as the transition term in a preamble of a claim, it is open-ended in the same manner as the term "comprising" is open ended.

FIG. 8 is a flow diagram representative of example machine readable instructions that may be executed by the client device 102 of FIGS. 1, 2, and 5-7 to report media object impressions to the AME 202 (FIGS. 2 and 5-7) and/or one or more database proprietors 204 (FIGS. 2 and 5-7). Initially, the client device 102 receives numerous media objects (e.g., the media objects 104a-d of FIGS. 1 and 2) (block 802). The client device 102 presents the media objects 104a-d (block 804). For example, the client device 102 may present the media objects 104a-d via a display interface and/or an audio interface. The client device 102 determines which of the media objects 104a-d is a collector media object (block 806). In the illustrated example, the client device 102 determines that the media object A 104a is a collector media object as shown in FIG. 2. For example, the client device 102 may identify the media object A 104a as the collector media object by detecting the collector instructions 206 (FIG. 2) embedded in the media object A 104a. Additionally or alternatively, the media object A 104a may notify the client device 102 that it is the collector media object.

The client device 102 executes the collector instructions 206 to collect media object characteristics (e.g., the media object characteristics 210a-d of FIG. 2) from media objects presented by the client device 102 (block 808). In the illustrated example, the collector instructions 206 cause the client device 102 to collect media object characteristics from the collector media object A 104a and the passive media objects 104b-d shown in FIG. 2. The client device 102 locates the media object characteristics 210a-d and an identifier (e.g., the identifier 214 of FIGS. 2, 5, and 6 and/or the shared key 702 of FIG. 7) in a beacon request (e.g., the beacon/impression request 212 of FIGS. 2 and 5-7) (block 810). The client device 102 sends the beacon/impression request 212 to the AME 202 (block 812). For example, the client device 102 sends the beacon/impression request 212 based on the beacon instructions 208 (FIG. 2) to the impression monitor 218 of the AME 202 as shown in FIGS. 2 and 5-7.

The client device 102 determines whether to send any beacon request(s) to any database proprietor(s) (e.g., the database proprietor(s) 204 of FIGS. 2 and 5-7) (block 814). For example, the beacon instructions 208 may include URLs of one or more database proprietor(s) 204 to which the client device 102 is to send beacon requests (e.g., the beacon request(s) 508 of FIG. 5 and/or the beacon request(s) 612 of FIG. 6). Additionally or alternatively, the client device 102 may receive one or more beacon response(s) (e.g., the beacon response 504 of FIG. 5 and/or the beacon response 606 of FIG. 6) from the impressions monitor 218, and send one or more beacon request(s) to one or more database proprietor(s) 204 based on one or more URL(s) located in the beacon response(s).

If the client device 102 determines at block 814 that it should not send one or more beacon request(s) to one or more database proprietor(s) 204, the example process of FIG. 8 ends. Otherwise, if the client device 102 determines at block 814 that it should send one or more beacon request(s) to one or more database proprietor(s) 204, the client device 102 determines which one or more database proprietor(s) 204 are target recipients of the one or more beacon request(s) (block 816). For example, the target database proprietor(s) 204 can be indicated in the beacon instructions 208 and/or in a beacon response from the impression monitor 218. The client device 102 generates the one or more beacon request(s) (e.g., the beacon request(s) 508 of FIG. 5 and/or the beacon request(s) 612 of FIG. 6) (block 818). For example, the client device 102 can generate the beacon request(s) intended for the one or more database proprietor(s) as discussed above in connection with FIG. 5 and/or FIG. 6. The client device 102 sends the beacon request(s) to the one or more target database proprietor(s) 204 (block 820). The example process of FIG. 8 then ends.

FIG. 9 is a flow diagram representative of example machine readable instructions that may be executed by the apparatus 216 (FIG. 2) at the AME 202 to log impressions for media objects (e.g., the media objects 104a-d of FIGS. 1 and 2). Initially, the impression monitor 218 (FIGS. 2 and 5-7) receives the beacon/impression request 212 (FIGS. 2 and 5-7) from the client device 102 (FIGS. 2 and 5-7) (block 902). The impression monitor 218 identifies the media objects 104a-d based on the media object characteristics 210a-d located in the beacon/impression request 212 (block 904). For example, the media object characteristics 210a-d may include media IDs that identify the media objects 104a-d. Alternatively, the media object characteristics 210a-d may include other characteristics (e.g., signatures, codes, identifiers, publisher URL's, etc.) that the impression monitor 218 may use to look up corresponding media IDs (e.g., using a reference media look-up database) to identify the media objects 104a-d. The impression monitor 218 logs impressions for the media objects 104a-d (block 906).

The creditor 220 (FIG. 2) determines a media object hierarchy for the media objects 104a-d (block 908). For example, the media object hierarchy may be implemented as disclosed above in connection with FIG. 4. The creditor 220 awards one or more causal credit(s) based on one or more of the media objects 104a-d based on the media object hierarchy (block 910). For example, the creditor 220 can award one or more causal credits based on the identified media object hierarchy to ones of the media objects 104a-d that contributed to creating the opportunity for presenting others of the media objects 104a-d as disclosed above in connection with FIG. 4. The example process of FIG. 9 then ends.

FIG. 10 is a flow diagram representative of example machine readable instructions that may be executed by the apparatus 216 (FIG. 2) at the AME 202 to associate demographic information with media object impressions. Initially, the panelist profile retriever 222 (FIG. 2) determines whether the client device 102 (FIGS. 1, 2, and 5-7) is recognized as being associated with a panel member (block 1002). For example, the panelist profile retriever 222 may determine whether the identifier 214 of FIGS. 2, 5, and 6 (and/or the shared key 702 of FIG. 7) received in the beacon/impression request 212 is stored in the panel database 224 in association with a panel member record. If the client device 102 is associated with a panel member, the panelist profile retriever 222 retrieves demographic information associated with the panel member from the panel database 224 (block 1004). For example, the panelist profile retriever 222 retrieves the demographic information based on the identifier 214 and/or the shared key 702.

After retrieving demographic information from the panel database 224 at block 1004 or if the panelist profile retriever 222 determines at block 1002 that the client device 102 is not associated with a panel member, the demographic collector 228 receives demographic information from one or more of the database proprietor(s) 204 (FIGS. 2 and 5-7) (block 1006). For example, the demographic collector 228 may receive the demographic information from the database proprietor(s) 204 using any suitable technique including any process described above in connection with FIGS. 5-7.

The demographic corrector 226 (FIG. 2) determines whether it should adjust any of the demographic information from the panel database 224 and/or the demographic information from the database proprietor(s) 204 (block 1008). For example, the demographic corrector 226 may be configured to analyze the demographic information from the panel database 224 relative to the demographic information from the database proprietor(s) 204 and to adjust any of the demographic information that is missing and/or inaccurate. In some examples in which the demographic corrector 226 is not provided and/or the demographic corrector 226 is disabled, the apparatus 216 does not adjust demographic information. If the demographic corrector 226 determines that it should not adjust demographic information, control advances to block 1012. Otherwise, if the demographic corrector 226 determines that it should adjust demographic information (block 1008), the demographic corrector 226 adjusts the demographic information (block 1010). For example, the demographic corrector 226 may adjust the demographic information from the panel database 224 by using demographic information from the database proprietor(s) 204 to fill-in missing data and/or correct inaccurate data. Additionally or alternatively, the demographic corrector 226 may adjust the demographic information from the database proprietor(s) 204 based on the demographic information from the panel database 224 to fill-in missing data and/or correct inaccurate data.

The attributor 230 (FIG. 2) associates the demographic information with an impression of a corresponding collector media object (e.g., the collector media object A 104a shown in FIG. 2) (block 1012). In addition, the attributor 230 determines one or more passive media object(s) that were reported in connection with the collector media object A 104a via the same beacon/impression request 212 (block 1014). For example, the attributor 230 may use the impressions logged by the impression monitor 218 to determine that the passive media objects 104*b-d* were reported in the same beacon/impression request 212 that reported the collector media object A 104*a*. The attributor 230 associates demographic information with one or more impression(s) of the corresponding passive media object(s) 104*b-d* (block 1016). In this manner, the attributor 230 can attribute the same demographics information retrieved for the collector media object A 104*a* to the passive media objects 104*b-d* that were reported in the same beacon/impression request 212. This technique is useful to accurately associate demographic information with multiple media object impressions logged based on a single beacon request from a client device. As such, a client device need not use more resources to send multiple beacon requests to the AME 202 to report impressions for multiple media objects. The example process of FIG. 10 then ends.

Figure 11:
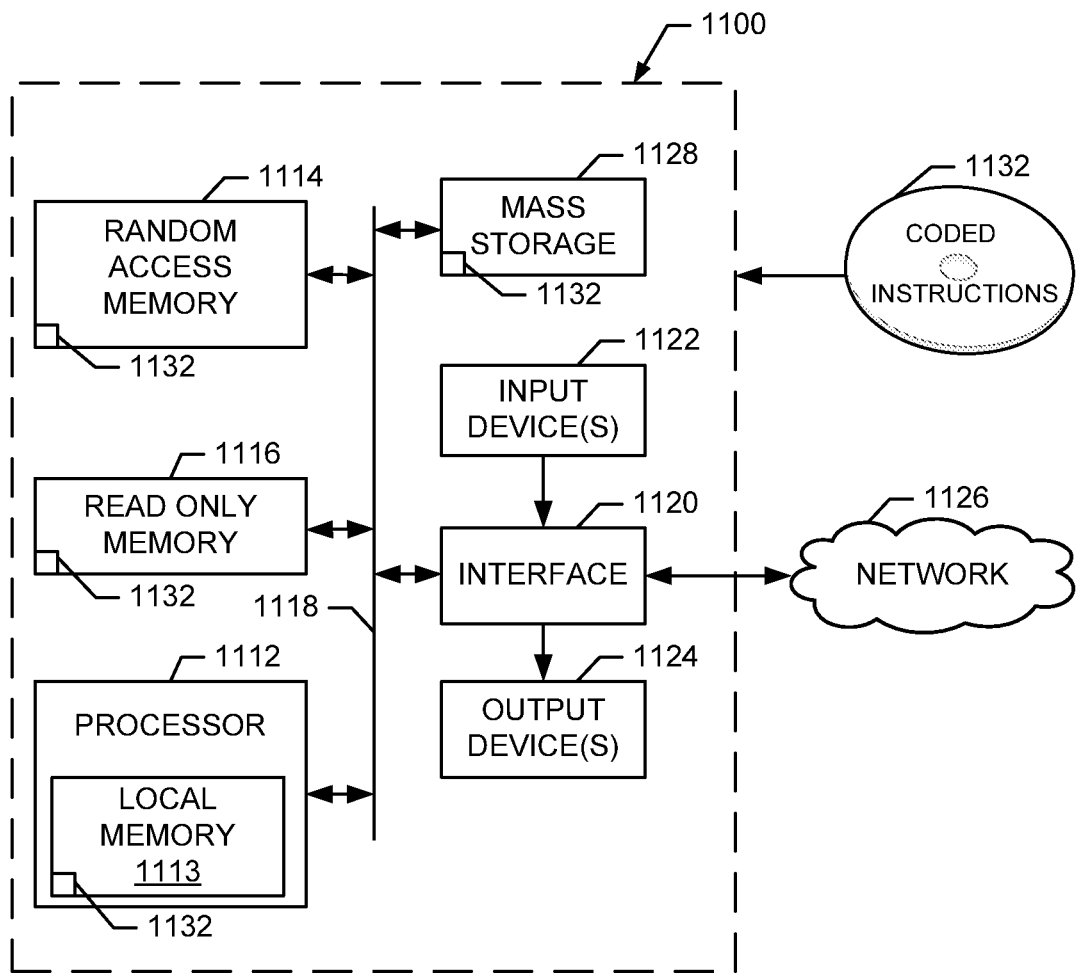
FIG. 11 is an example processor system that can be used to execute the example instructions of FIGS. 8-10 to implement example apparatus and systems disclosed herein.

FIG. 11 is a block diagram of an example processor platform 1100 that is capable of executing example instructions of FIGS. 8-10 to implement the client device 102 of FIGS. 1, 2, and 5-7 and/or the apparatus 216 of FIG. 2. The processor platform 1100 can be, for example, a server, a personal computer, a mobile device (e.g., a cell phone, a smart phone, a tablet such as an iPad™ tablet), a personal digital assistant (PDA), an Internet appliance, a digital versatile disk (DVD) player, a compact disk (CD) player, a digital video recorder, a Blu-ray player, a gaming console, a personal video recorder, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit a user to enter data and commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1120 of the illustrated example, thus, typically includes a graphics driver card.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, CD drives, Blu-ray disk drives, RAID systems, and DVD drives.

Coded instructions 1132 of the illustrated example represent the example machine readable instructions represented by the flow diagrams of FIGS. 8-10. The example coded instructions 1132 may be stored in the mass storage device 1128, in the volatile memory 1114, in the non-volatile memory 1116, and/or on a removable tangible computer readable storage medium such as a CD or DVD.

From the foregoing, it will be appreciated that examples have been disclosed to facilitate using a single communication from a client device to communicate multiple impressions to a collection facility about multiple media objects presented/displayed concurrently at the client device. When multiple media objects are presented by the client device, one of the media objects operates as a collector media object. The collector media object collects media object parameters from all of the other media objects being concurrently presented at the client device. In this manner, instead of all of the concurrently presented media objects sending corresponding beacon requests to a collection facility, the collector media object sends a single beacon request with all of the collected media object information from all of the other presented media objects. This significantly reduces the amount of network bandwidth and communication resources required by the client device to report on the concurrently presented media objects to the collection facility. In addition, this enables determining relationships (e.g., causal relationships) between the different media objects.

Although certain methods, apparatus, systems, and articles of manufacture have been disclosed herein, the scope of coverage of this patent is not limited thereto. To the contrary, this patent covers all methods, apparatus, systems, and articles of manufacture fairly falling within the scope of the claims either literally or under the doctrine of equivalents.

What is claimed is:

1. A method comprising:
 receiving at a client device a plurality of first network communications from at least a first server, the first network communications including a collector media object and a plurality of second media objects for presenting at the client device, the collector media object and the plurality of second media objects embedded in a webpage, the collector media object being at least one of streaming video, streaming audio, internet protocol television (IPTV) content, a movie, a television program, or an advertisement;
 performing at least one collecting operation by a processor executing a first instruction in the collector media object presented at the client device, the at least one collecting operation defined by the first instruction, the at least one collecting operation including collecting a first characteristic of the collector media object and collecting second characteristics corresponding to the plurality of second media objects, the second media objects presented at the client device concurrently with the collector media object; and based on the processor executing a second instruction associated with the collector media object, transmitting a second network communication from the client device to a second server of an audience measurement entity, the second network communication reporting multiple impressions corresponding to the presentations of the collector media object and the second media objects at the client device, the reporting of the multiple impressions including sending the first and second characteristics and an identifier associated with the client device in the second network communication.

2. The method as defined in claim 1, further including sending a third network communication to a database proprietor to request demographics information associated with the client device.

3. The method as defined in claim 2, wherein the sending of the third network communication to the database proprietor is based on a rule located in the collector media object.

4. The method as defined in claim 2, wherein the sending of the third network communication to the database proprietor is based on an address of the database proprietor located in a redirect request received at the client device.

5. The method as defined in claim 2, wherein the identifier is a first cookie corresponding to the audience measurement entity, and the sending of the third network communication includes sending a second cookie corresponding to the database proprietor in the third network communication.

6. The method as defined in claim 2, wherein the database proprietor is a social network service.

7. The method as defined in claim 1, wherein the first characteristic is first metadata encoded in the collector media object, and the second characteristics are at least one of second metadata encoded in the second media objects or signatures generated based on the second media objects.

8. The method as defined in claim 1, wherein the second characteristics are signatures of the second media objects, and collecting the signatures includes performing a screen capture, and generating the signatures based on corresponding images of the second media objects.

9. The method as defined in claim 1, further including, based on the processor executing the second instruction located in the collector media object, sending a uniform resource locator of a host website of the collector media object and the second media objects to the audience measurement entity.

10. The method as defined in claim 1, wherein the second media objects include at least one of an advertisement, video, or audio.

11. The method as defined in claim 1, wherein the collector media object and the plurality of second media objects are concurrently embedded in spatially distinct visible regions of the webpage.

12. A tangible computer readable storage medium comprising instructions that, when executed, cause a processor to at least:

receive a plurality of first network communications from at least a first server, the first network communications including a collector media object and a plurality of second media objects for presenting at a client device, the collector media object and the plurality of second media objects embedded in a webpage, the collector media object being at least one of streaming video, streaming audio, internet protocol television (IPTV) content, a movie, a television program, or an advertisement;

based on a first instruction in the collector media object presented at the client device, perform at least one collecting operation, the at least one collecting operation defined by the first instruction, the at least one collecting operation including collecting a first characteristic of the collector media object and collecting second characteristics corresponding to the plurality of second media objects, the plurality of second media objects presented at the client device concurrently with the collector media object; and based on a second instruction associated with the collector media object, transmit a second network communication from the client device to a second server of an audience measurement entity, the second network communication reporting multiple impressions corresponding to the presentations of the collector media object and the second media objects at the client device, the reporting of the multiple impressions including sending the first and second characteristics and an identifier associated with the client device in the second network communication.

13. The tangible computer readable storage medium as defined in claim 12, wherein the second instruction further causes the processor to send a third network communication to a database proprietor to request demographics information associated with the client device.

14. The tangible computer readable storage medium as defined in claim 13, wherein the second instruction causes the processor to send the third network communication to the database proprietor based on a rule located in the collector media object.

15. The tangible computer readable storage medium as defined in claim 13, wherein the second instruction causes the processor to send the third network communication to the database proprietor based on an address of the database proprietor located in a redirect request received at the client device.

16. The tangible computer readable storage medium as defined in claim 13, wherein the identifier is a first cookie corresponding to the audience measurement entity, and the second instruction causes the processor to send the third network communication by sending a second cookie corresponding to the database proprietor in the third network communication.

17. The tangible computer readable storage medium as defined in claim 13, wherein the database proprietor is a social network service.

18. The tangible computer readable storage medium as defined in claim 12, wherein the first characteristic is first metadata encoded in the collector media object, and the second characteristics are at least one of second metadata encoded in the second media objects or signatures generated based on the second media objects.

19. The tangible computer readable storage medium as defined in claim 12, wherein the second characteristics are signatures of the second media objects, and the first instruction causes the processor to collect the signatures by performing a screen capture, and generating the signatures based on corresponding images of the second media objects.

20. The tangible computer readable storage medium as defined in claim 12, wherein the second instruction further causes the processor to send a uniform resource locator of a host website of the collector media object and the second media objects to the audience measurement entity.

21. The tangible computer readable storage medium as defined in claim 12, wherein the second media objects include at least one of an advertisement, video, or audio.

22. An apparatus comprising:
an interface circuit to receive at a client device a plurality of first network communications from at least a first server, the first network communications including a collector media object and a plurality of second media objects for presenting at the client device, the collector media object and the plurality of second media objects embedded in a webpage, the collector media object being at least one of streaming video, streaming audio, internet protocol television (IPTV) content, a movie, a television program, or an advertisement; and
a collector to perform at least one collecting operation by executing a first instruction in the collector media object presented at the client device, the at least one collecting operation defined by the first instruction, the at least one collecting operation including collecting a first characteristic of the collector media object and collecting second characteristics corresponding to the plurality of second media objects, the second media objects presented at the client device concurrently with the collector media object, the interface circuit to transmit, based on a second instruction associated with the collector media object presented at the client device, a second network communication from the client device to a second server of an audience measurement entity, the second network communication to report multiple impressions corresponding to the presentations of the collector media object and the second media objects at the client device, the reporting of the multiple impressions including sending the first and second characteristics and an identifier associated with the client device in the second network communication.

23. The apparatus as defined in claim 22, wherein the interface circuit is further to send a third network communication to a database proprietor to request demographics information associated with the client device.

24. The apparatus as defined in claim 23, wherein the interface circuit is to send the third network communication to the database proprietor based on a rule located in the collector media object.

25. The apparatus as defined in claim 23, wherein the interface circuit is to send the third network communication to the database proprietor based on an address of the database proprietor located in a redirect request received at the client device.

26. The apparatus as defined in claim 23, wherein the identifier is a first cookie corresponding to the audience measurement entity, and the interface circuit is to send the third network communication by sending a second cookie corresponding to the database proprietor in the third network communication.

27. The apparatus as defined in claim 23, wherein the database proprietor is a social network service.

28. The apparatus as defined in claim 22, wherein the first characteristic is first metadata encoded in the collector media object, and the second characteristics are at least one of second metadata encoded in the second media objects or signatures generated based on the second media objects.

29. The apparatus as defined in claim 22, wherein the second characteristics are signatures of the second media objects, and the collector is to collect the signatures by performing a screen capture, and generating the signatures based on corresponding images of the second media objects.

30. The apparatus as defined in claim 22, wherein the interface circuit is further to send a uniform resource locator of a host website of the collector media object and the second media objects to the audience measurement entity.

31. The apparatus as defined in claim 22, wherein the second media objects include at least one of an advertisement, video, or audio.

* * * * *